US012572783B1

(12) United States Patent
Neat et al.

(10) Patent No.: US 12,572,783 B1
(45) Date of Patent: Mar. 10, 2026

(54) IDEOGRAPHIC CONTRASTIVE AUTOENCODER FOR LARGE LANGUAGE MODEL FINE-TUNING

(71) Applicant: Strava, Inc., San Francisco, CA (US)

(72) Inventors: Leo Neat, San Francisco, CA (US); Daniel Sanders, North Bend, WA (US)

(73) Assignee: Strava, Inc., San Francisco, CA (US)

( * ) Notice: Subject to any disclaimer, the term of this patent is extended or adjusted under 35 U.S.C. 154(b) by 0 days.

(21) Appl. No.: 18/990,590

(22) Filed: Dec. 20, 2024

Related U.S. Application Data

(60) Provisional application No. 63/714,677, filed on Oct. 31, 2024.

(51) Int. Cl.
G06N 3/091 (2023.01)
G06N 3/0455 (2023.01)

(52) U.S. Cl.
CPC ........... G06N 3/0455 (2023.01); G06N 3/091 (2023.01)

(58) Field of Classification Search
CPC ............................. G06N 3/0455; G06N 3/091
See application file for complete search history.

(56) References Cited

U.S. PATENT DOCUMENTS

| | | |
|---|---|---|
| 10,857,426 B1 | 12/2020 | Neumann |
| 2017/0097748 A1 | 4/2017 | Wernick |

| | | |
|---|---|---|
| 2020/0075167 A1 | 3/2020 | Srivastava |
| 2022/0107852 A1 | 4/2022 | Kulkarni |
| 2022/0249906 A1 | 8/2022 | Phillips |

OTHER PUBLICATIONS

Beltagy, I.,et al, SCIBERT: A Pretrained Language Model for Scientific Text, [received Feb. 28, 2025]. Retrieved from Internet:<https://arxiv.org/abs/1903.10676> (Year: 2019).*
Chen, X., et al, Joint Learning of Character and Word Embeddings, [received Feb. 28, 2025]. Retrieved from Internet:<chrome-extension://efaidnbmnnnibpcajpcglclefindmkaj/https://citeseerx.ist.psu.edu/document?repid=rep1&type=pdf&doi=caf5d65a51f70a829b8d73422f48e52a42635fa4> (Year: 2015).*
Galindo, J., et al, Large Language Models to generate meaningful feature model instances, [received Feb. 28, 2025]. Retrieved from Internet: <https://dl.acm.org/doi/abs/10.1145/3579027.3608973> (Year: 2023).*

(Continued)

*Primary Examiner* — Miranda M Huang
*Assistant Examiner* — Bart I Rylander
(74) *Attorney, Agent, or Firm* — Van Pelt, Yi & James LLP

(57) ABSTRACT

Ideographic contrastive autoencoder for large language model fine-tuning is disclosed, including: obtaining a set of user activities according to a specified task; obtaining respective sets of input features from the set of user activities; using an encoder network of an autoencoder to encode the respective sets of input features into a set of words; prompting a machine learning model to perform the specified task using the set of words, wherein the machine learning model has been fine-tuned using a custom lexicographical vocabulary associated with the autoencoder; and presenting, at a user interface, a message determined based at least in part on an output result from the machine learning model.

22 Claims, 14 Drawing Sheets

(56) References Cited

OTHER PUBLICATIONS

Liu, et al, Joint Character-Level Word Embedding and Adversarial Stability Training Training to Defend Adversarial Text, [received Feb. 28, 2025]. Retrieved from Internet:<https://ojs.aaai.org/index.php/AAAI/article/view/6356> (Year: 2020).*

Lovas, S., AI Chatbots in Health: Implementing an LLM-Based Solution to Promote Physical Activity, [received Feb. 28, 2025]. Retrieved from Internet:<https://munin.uit.no/handle/10037/34247> (Year: 2024).*

Thirunavukarasu, A., et al, Large language models in medicine, [received Feb. 28, 2025]. Retrieved from Internet:<https://www.nature.com/articles/s41591-023-02448-8> (Year: 2023).*

Wang, H., et al, Beyond Direct Diagnosis: LLM-based Multi-Specialist Agent Consultation for Automatic Diagnosis, [received Feb. 28, 2025]. Retrieved from Internet:<https://arxiv.org/abs/2401.16107> (Year: 2024).*

Wang, S., et al, An Overview of Unsupervised Deep Feature Representation for Text Categorization, [received Feb. 28, 2025]. Retrieved from Internet:<https://ieeexplore.ieee.org/abstract/document/8700490?casa_token=spwvWvcUTwQAAAAA:Q1gdFozqqlhNzif u3P8XNsqgEOGGLvVUcEcfd8YZyTfli29rWSkTcwsrAGK3ti2PD y6i0sgr> (Year: 2019).*

Xue, C., et al, Image-to-Character-to-Word Transformers for Accurate Scene Text Recognition, [received Feb. 28, 2025]. Retrieved from Internet:<https://ieeexplore.ieee.org/abstract/document/10041804? casa_token=wKb9C21x4_IAAAAA:T0JzKc5nn7seY_ nvDcjxOmbWIQpNxtgec6TLZafn--sSIWysGfKRLF_3A- zNKHhHBNBy4-_9> (Year: 2022).*

Zhao, L., et al, Optimizing Large Language Models on Multi-Core CPUs: A Case Study of the BERT Model, [received Feb. 28, 2025]. Retrieved from Internet:<https://www.mdpi.com/2076-3417/14/6/2364> (Year: 2024).*

Liu, et al, Pre-train, Prompt, and Predict: A Systematic Survey of Prompting Methods in Natural Language Processing, [received May 30, 2025]. Retrieved from Internet:<https://dl.acm.org/doi/full/10.1145/3560815> (Year: 2023).*

Kim, et al, I-BERT: Integer-only BERT Quantization, [received May 30, 2025]. Retrieved from Internet:<https://proceedings.mlr.press/v139/kim21d.html> (Year: 2021).*

* cited by examiner

100

108

Activity Encoding and Model Prompting Server

202 — Training Data Storage

204 — Autoencoder Training Engine

206 — Autoencoder Parameters Storage

208 — LLM Fine-Tuning Engine

210 — Fine-tuned LLM Parameters Storage

212 — Inference Engine

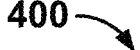
400
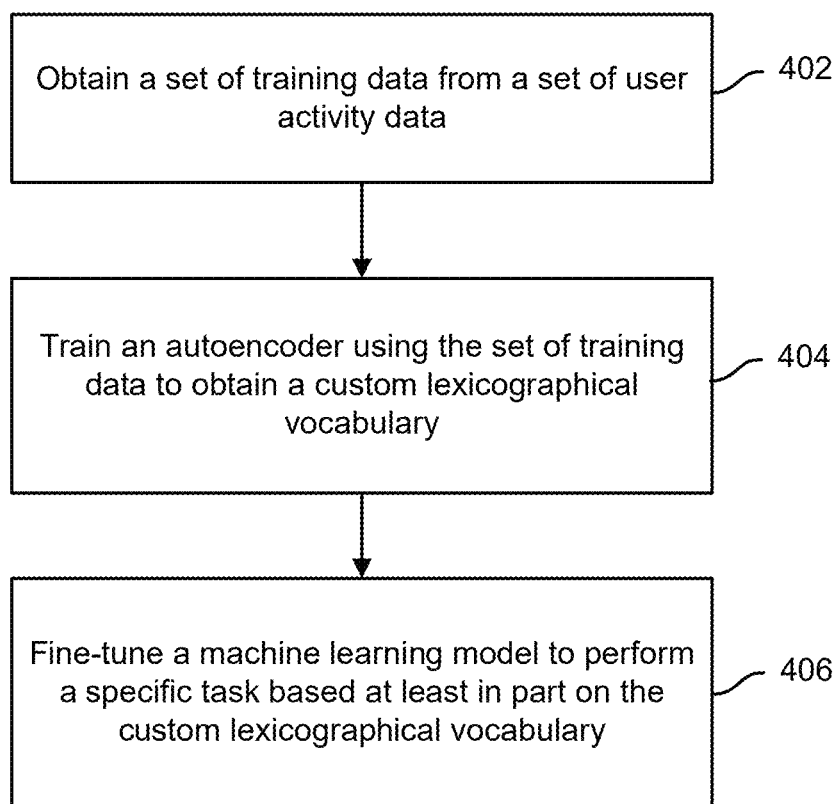
Obtain a set of training data from a set of user activity data    402
Train an autoencoder using the set of training data to obtain a custom lexicographical vocabulary    404
Fine-tune a machine learning model to perform a specific task based at least in part on the custom lexicographical vocabulary    406
FIG. 4

500

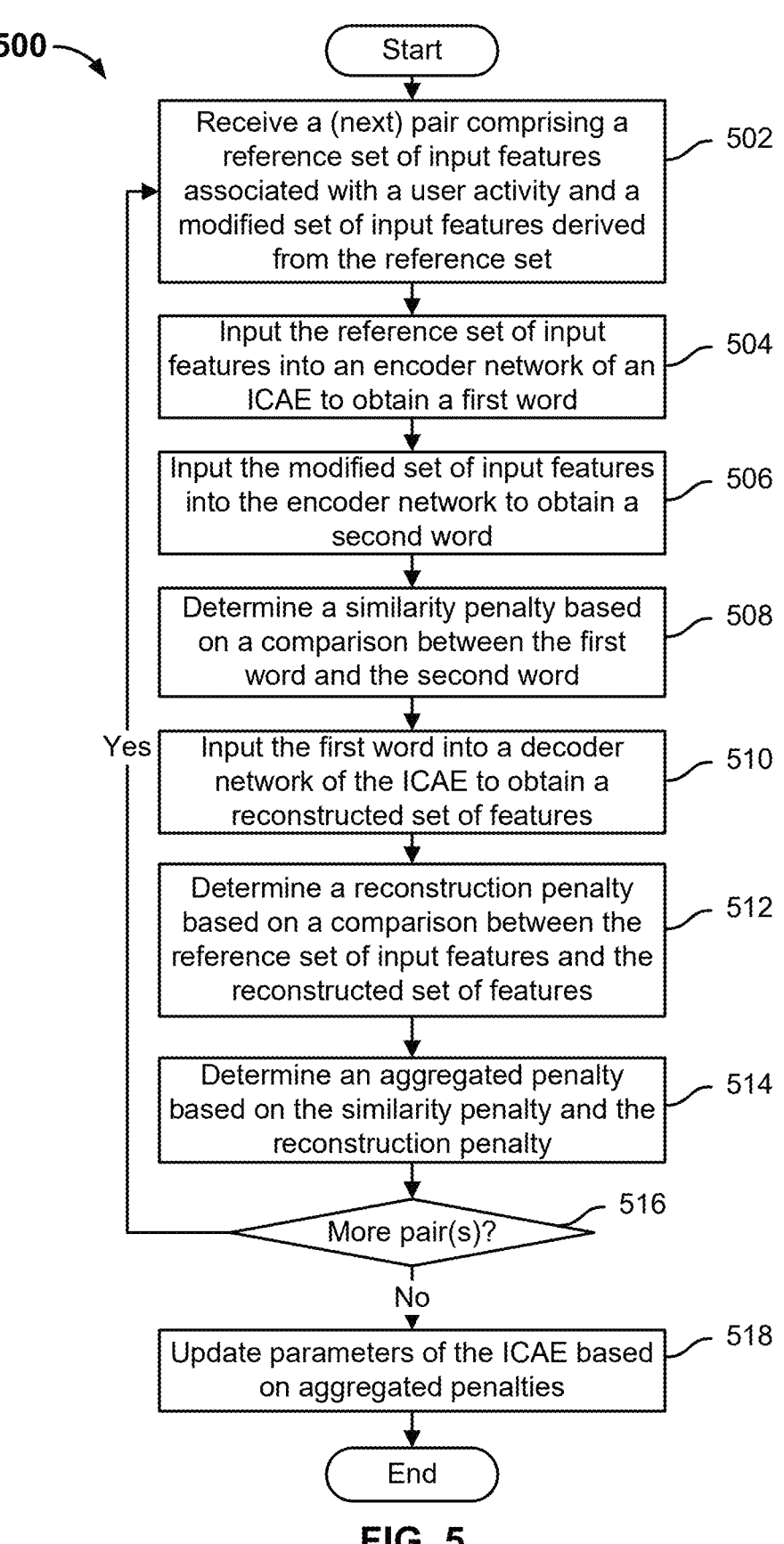

Start

Receive a (next) pair comprising a reference set of input features associated with a user activity and a modified set of input features derived from the reference set — 502

Input the reference set of input features into an encoder network of an ICAE to obtain a first word — 504

Input the modified set of input features into the encoder network to obtain a second word — 506

Determine a similarity penalty based on a comparison between the first word and the second word — 508

Yes

Input the first word into a decoder network of the ICAE to obtain a reconstructed set of features — 510

Determine a reconstruction penalty based on a comparison between the reference set of input features and the reconstructed set of features — 512

Determine an aggregated penalty based on the similarity penalty and the reconstruction penalty — 514

More pair(s)? — 516

No

Update parameters of the ICAE based on aggregated penalties — 518

End

FIG. 5

Similarity penalty = Euclidean difference(<first word>, <second word>)

Reference set of input features → Encoder Network → First ("regular") word → Decoder Network → Reconstructed set of features Reconstruction penalty = Difference(<reference set of input features>, <reconstructed set of features>)

800

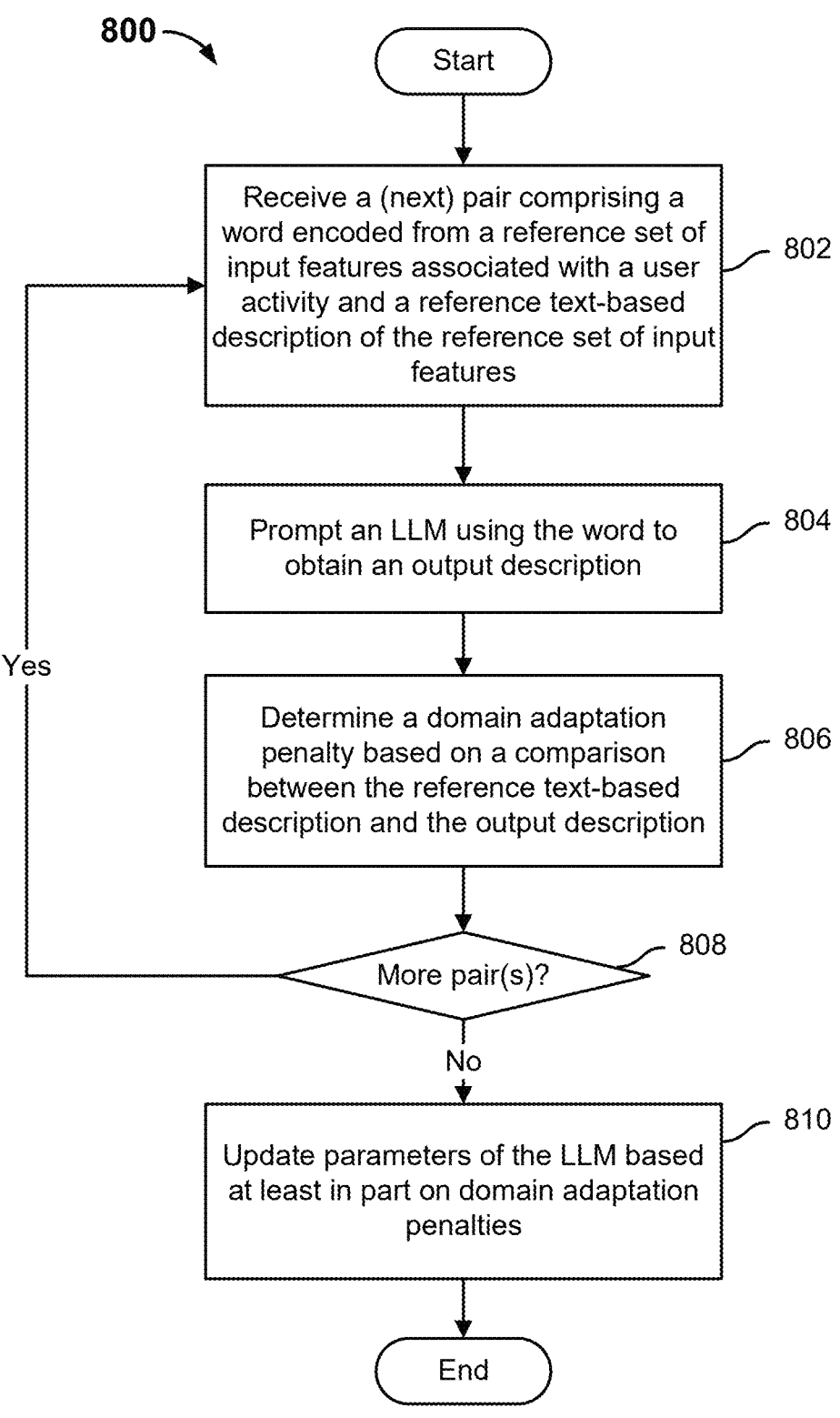

Start

Receive a (next) pair comprising a word encoded from a reference set of input features associated with a user activity and a reference text-based description of the reference set of input features — 802

Prompt an LLM using the word to obtain an output description — 804

Determine a domain adaptation penalty based on a comparison between the reference text-based description and the output description — 806

More pair(s)? — 808

Yes

No

Update parameters of the LLM based at least in part on domain adaptation penalties — 810

End

FIG. 8

Word → LLM → Output Description

Domain adaptation penalty = Difference(<reference text-based description of a reference set of input features from which the word was encoded>, <output description>)

Task-specific prompt that includes set of word(s)

LLM

Output result

Task-specific penalty = Difference(<reference text-based result>, <output result>)

1200

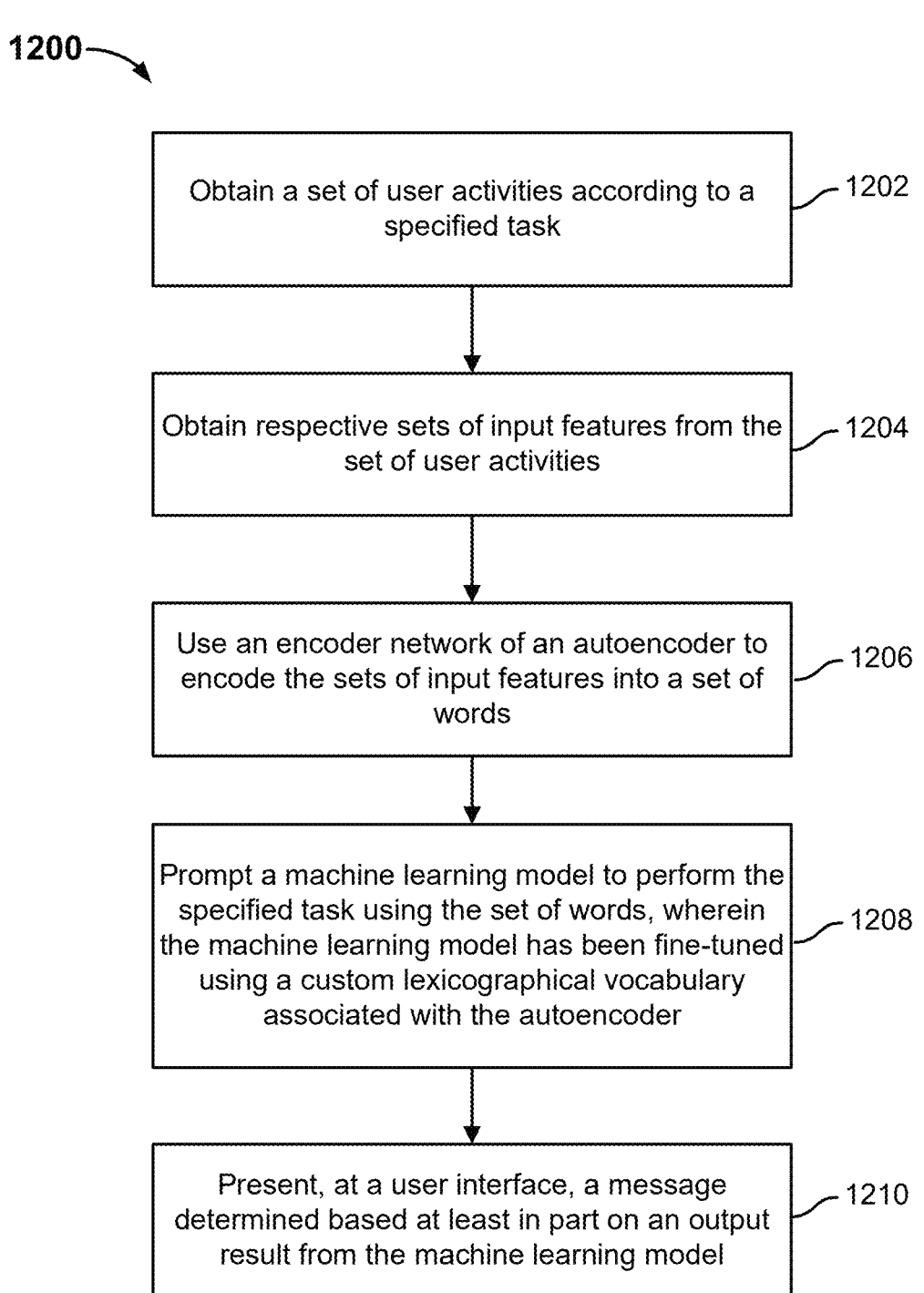

Obtain a set of user activities according to a specified task — 1202

Obtain respective sets of input features from the set of user activities — 1204

Use an encoder network of an autoencoder to encode the sets of input features into a set of words — 1206

Prompt a machine learning model to perform the specified task using the set of words, wherein the machine learning model has been fine-tuned using a custom lexicographical vocabulary associated with the autoencoder — 1208

Present, at a user interface, a message determined based at least in part on an output result from the machine learning model — 1210

FIG. 12

IDEOGRAPHIC CONTRASTIVE AUTOENCODER FOR LARGE LANGUAGE MODEL FINE-TUNING

CROSS REFERENCE TO OTHER APPLICATIONS

This application claims priority to U.S. Provisional Patent Application No. 63/714,677 entitled IDEOGRAPHIC CONTRASTIVE AUTOENCODER FOR LARGE LANGUAGE MODEL FINE-TUNING filed Oct. 31, 2024 which is incorporated herein by reference for all purposes.

BACKGROUND OF THE INVENTION

Location and other auxiliary data associated with an instance of a user's activity (e.g., a run or bike ride) can be recorded by a device during the user's performance of the activity. The data associated with each user activity may include several dimensions (e.g., speed, distance, elevation) along which the device records data for each user activity and may also be represented in a structured way.

It may be desirable to use an LLM to perform tasks that involve taking into account the recorded data of one or more user activities. In some instances, the cost to run a large language model (LLM) is dependent on the number of tokens (e.g., characters, phrases, or words) that are to be input into the LLM in a prompt and the number of tokens to be output by the LLM in response to the prompt. However, the inclusion of recorded activities, which includes several dimensions and is of a structured nature, in a prompt to the LLM will require a large input token space that will drive up the cost of using the LLM and also increase the computation time that may be required by the LLM to process the user activity data. Additionally, the high cardinality inherent to this data makes it difficult for an LLM to actually discern patterns in the data and generate useful insights/responses. As such, it is desirable to represent the user activity data in a more compact form for more efficient leveraging of the LLM.

BRIEF DESCRIPTION OF THE DRAWINGS

Various embodiments of the invention are disclosed in the following detailed description and the accompanying drawings.

FIG. 4 is a flow diagram showing an embodiment of a process for training an autoencoder and for fine-tuning a machine learning model.

FIG. 5 is a flow diagram showing an example process of training an ICAE in accordance with some embodiments.

FIG. 8 is a flow diagram showing an example process of fine-tuning an LLM in the domain adaptation phase in accordance with some embodiments.

FIG. 12 is a flow diagram showing an embodiment of a process for using a trained autoencoder and a fine-tuned machine learning model during inference.

DETAILED DESCRIPTION

Figure 1:
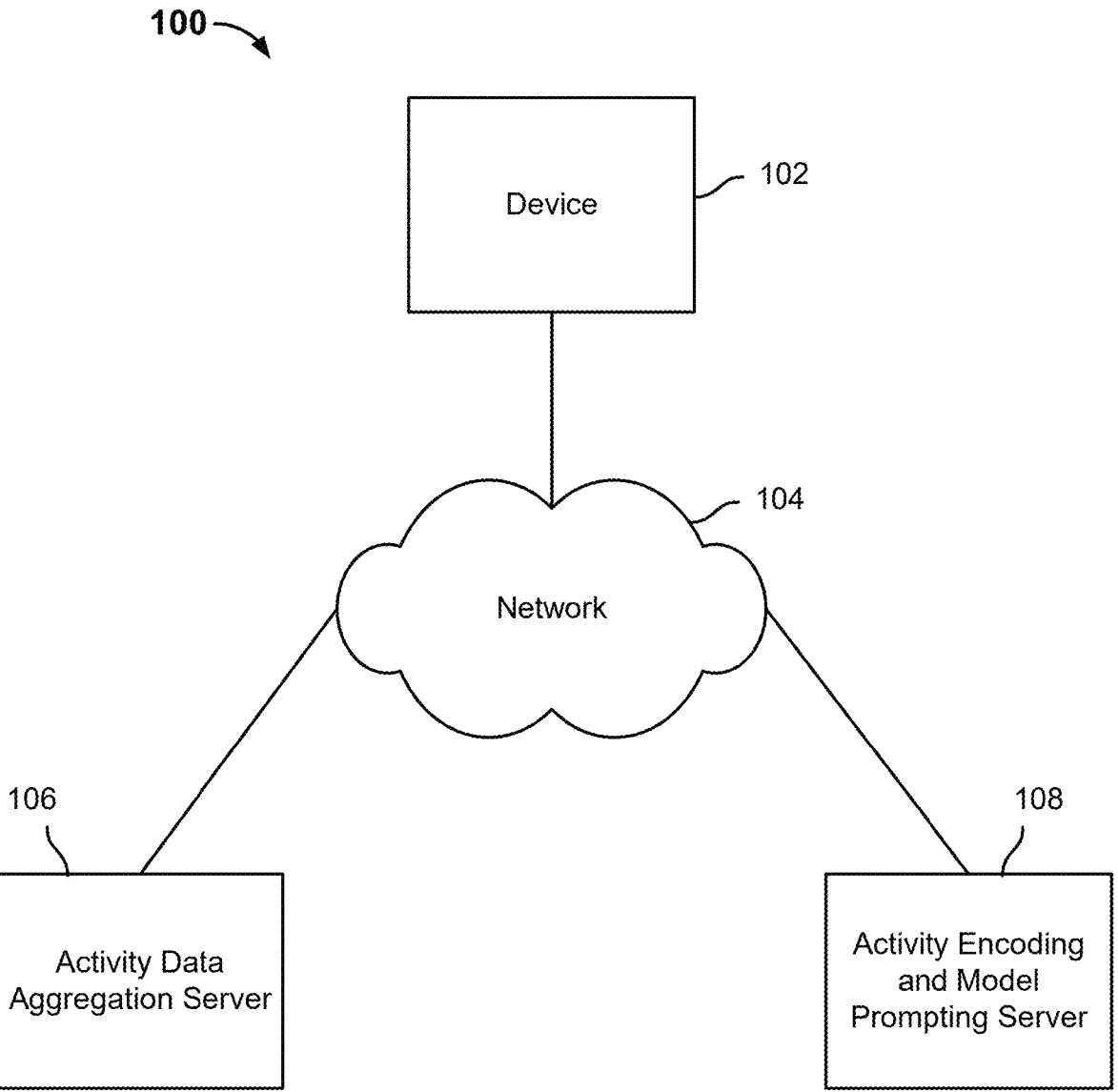
FIG. 1 is a diagram showing an embodiment of a system for using aggregated activity data to train an autoencoder for fine-tuning a large language model in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of training an autoencoder and fine-tuning a machine learning model are described herein. A set of training data is obtained from a set of user activity data. Examples of user activity data comprise recorded geographic (e.g., GPS data) and auxiliary data associated with an athletic activity during the activity. Example types of activities include cycling, running, and skiing. An autoencoder is trained using the set of training data to obtain a custom lexicographical vocabulary. As will be described in further detail below, in various embodiments, a "custom lexicographical vocabulary" comprises encoded "words" and corresponding features of activities that are represented by the encoded words. In various embodiments, a "word" comprises a series of characters of a fixed length that encode a corresponding set of input (e.g., activity) features and where similar words encode similar sets of input features. A machine learning model is fine-tuned to perform a task based at least in part on the custom lexicographical vocabulary. As will be described in further detail below, a foundational machine learning model (e.g., a large language model (LLM)) is fine-tuned to adapt to the custom lexicographical vocabulary (e.g., to learn the meaning of the custom lexicographical vocabulary). Then, after being adapted to the custom lexicographical vocabulary, the LLM is further fine-tuned to perform a specific task in which the prompt is to include one or more words (e.g., each word encoding the features of a respective recorded user activity) from the custom lexicographical vocabulary.

Embodiments of using a fine-tuned machine learning model to perform a task on encoding are described herein. A set of user activities are obtained according to a specified task. For example, the specified task may be in relation to a requested task type and also specific user. So, historically recorded user activities of that user and according to the requested task type may have been obtained. Examples of tasks include predicting/recommending a user activity and/or performing a summarization of provided activities. Respective sets of input features are obtained from the set of user activities. For example, a set of input features is extracted from a corresponding recorded user activity and comprises structured (e.g., recorded and/or computed) attributes/metrics related to the activity. Specific examples of such input features extracted from a user activity may include distance, average speed, elevation gain, altitude, weather, location, activity type, power, athlete/group identity, age of athlete, gender of athlete, total user activity data by activity, routes used by athlete, an encapsulation of a speed stream, an encapsulation of a heartrate stream, and an encapsulation of a GPS data stream. An encoder network of an autoencoder (e.g., an ideographic contrastive autoencoder (ICAE)) is used to encode the sets of input features into a set of words. In various embodiments, the autoencoder has been trained to determine a custom lexicographical vocabulary that compresses a large volume of structured data (e.g., a set of input features) into a compact word (e.g., of a fixed-length/number of characters). At inference, a machine learning model (e.g., an LLM), which has been fine-tuned using the custom lexicographical vocabulary, is prompted to perform the specified task using the set of words. A message that is determined based on an output (e.g., a performance of the specified task on the given set of words) from the machine learning model is presented at a user interface. For example, the message comprises a text-based description of a predicted/recommended user activity (e.g., that is personalized for the specific user) and/or a summarization of the user activities for which corresponding encoded words were included in the prompt.

Embodiments described herein provide techniques for converting high-cardinality structured datasets into a lexicographically meaningful textual format using a new Machine Learning Model called Ideographic Contrastive Autoencoders (ICAEs) and fine-tuning a foundation Large Language Model (LLM) for tasks such as, for example, sequence prediction and summarization tasks. Various embodiments described herein enable the generation of ideographic representations that can be interpreted by an LLM as compressed objects in a fixed token space (e.g., a fixed character length). This fine-tuned LLM can be used to summarize the structured data's behaviors, patterns, and trends in a digestible format with a text output or an output comprising a compressed object of a fixed token space.

In recent years, two key advancements in machine learning-Large Language Models (LLMs) and Autoencoders (AEs) have enabled complex sequencing and representation learning tasks. LLMs, based on the transformer architecture, excel at capturing relationships between tokens in sequences, making them well-suited for complex pattern prediction and summarization tasks. However, efficiently representing high-dimensional, structured data is a challenge. It would be desirable to minimize the size of the token space of a prompt into an LLM and/or minimize the size of the token space of the output from the LLM for the purpose of facilitating more efficient computation by the LLM, for which the computation resources and cost increase with the sizes of the token spaces at the input and output. It would also be desirable to selectively use the LLM, which is computationally expensive to run, in general. As will be described in further detail below, the ICAE addresses these issues by encoding high-dimensional input (e.g., features of several dimensions that have been extracted from a recorded user activity) into a compressed and discrete latent space (e.g., an encoded word of a fixed length), allowing structured data to be represented as low-dimensional words where similar words represent similar things (e.g., user activities with similar features).

This design leverages the capabilities of both ICAE and LLMs by converting high-dimensional activity/user data into a learned textual syntax, enabling efficient and/or selective use of LLMs for generating predictions and summarizations.

FIG. 1 is a diagram showing an embodiment of a system for using aggregated activity data to train an autoencoder for fine-tuning a large language model in accordance with some embodiments. System 100 includes device 102, network 104, activity data aggregation server 106, and activity encoding and model prompting server 108. Network 104 may include high-speed data networks and/or telecommunication networks.

Device 102 is a device that can record Global Positioning System (GPS) data and/or other data associated with an activity. Device 102 can also be a device to which GPS data and/or other data associated with a physical activity can be uploaded or transferred. Examples of device 102 include, but are not limited to: a GPS device (e.g., Garmin Forerunner® and Edge® devices, including Garmin Forerunner® 110, 205, 301, 305, 310XT, 405, 405CX, and Garmin Edge® 305, 605, 705, 500, 800, 810, and 1000), a mobile phone, such as a smart phone (e.g., an Android®-based device or Apple iPhone® device) including a GPS recording application (e.g., MotionX®, Endomondo®, Strava®, and RunKeeper®), a computer, a tablet device, and/or other general purpose computing devices and/or specialized computing devices, which typically include a general processor, a memory or other storage component(s), a network or input/output (I/O) capability, and possibly integrated GPS functionality or support or an interface for a GPS device or GPS functionality.

In various embodiments, device 102 (or an activity tracking application executing thereon) is configured to record GPS data and auxiliary data associated with an athletic activity during the activity. For example, auxiliary data associated with an activity may include physiological, environmental, and/or performance data. In some embodiments, device 102 is configured to receive recorded GPS data and auxiliary data associated with an activity subsequent to the completion of the activity (e.g., such information is uploaded to device 102). In various embodiments, a recorded activity is a series (a stream) of measurements recorded at corresponding instances/points in time during a user's activity. For example, at each point/instance of time, one or more of the following measurements are recorded and/or computed from recorded data: current geographic (e.g., GPS)/location information, current time, cumulative distance, current elevation, current altitude, current power, current pace, current elevation gradient, current heart rate, and acceleration (e.g., as measured by an accelerometer).

In some embodiments, an "activity" refers to an instance of an athletic performance. Example types of an activity include cycling, running, and skiing. In some embodiments, the recorded GPS data associated with an activity includes a series/stream of consecutive and discrete GPS data points (e.g., latitude and longitude coordinates sometimes referred to as "Lat-Lng Data") with a timestamp for each GPS data point. In some embodiments, auxiliary data includes, but is not limited to, barometric data (e.g., elevation/gradient data), heart rate, power/watts (e.g., energy expended), time, speed (e.g., mean and/or maximum speed per segment and/or route, in which mean speed, for example, can be derived from time and GPS information), and/or cadence. Auxiliary data can be recorded at various granularities. For example, auxiliary data can correspond to each GPS data point, the entire activity (e.g., the auxiliary data includes means of the metrics), and/or portions of the activity. As an example, one can use device 102 on a bike ride. At the end of the bike ride, the athlete can review his performance with the recorded GPS data (e.g., through a user interface of device 102) to observe the geographical track (e.g., the set/stream of GPS points) that he traversed, how much energy he expended along the ride, how fast he finished it in, mean speed, elevation-based metrics, and/or other metrics. In some embodiments, device 102 is configured to store the recorded GPS data and the auxiliary data and/or send the recorded data associated with an athletic activity to activity data aggregation server 106. In some embodiments, device 102 is configured to send the recorded data associated with an activity to activity data aggregation server 106 during the activity (e.g., in real-time) and/or after the activity has been completed. In some embodiments, device 102 is configured to present an interactive user interface (e.g., through an activity tracking application executing at device 102). The user interface may display GPS data and receive selections (e.g., made by a user) with respect to the displays. In some embodiments, device 102 sends the selections that it receives to activity encoding and model prompting server 108.

In some embodiments, a user interface may be presented at device 102. In some embodiments, the user interface may be presented by activity encoding and model prompting server 108 through an associated activity tracking application executing at device 102 or by another component that is not shown in the example of FIG. 1. In some embodiments, the user interface is configured to show a visual output that is determined by activity encoding and model prompting server 108. In some embodiments, the visual output is determined based on the adjustment of the pace of a recorded (e.g., run) activity based on a GAP model that was generated by activity encoding and model prompting server 108. The user inputs and/or selections received at device 102 are configured to be sent to activity encoding and model prompting server 108.

Activity data aggregation server 106 is configured to aggregate recorded athletic activity data from devices such as device 102. In some embodiments, the activity data received at activity data aggregation server 106 is received during the activities (e.g., in real-time) and/or subsequent to the completion of the activities. Activity data aggregation server 106 is configured to store information associated with each activity. For example, information associated with each activity includes an identifier associated with the athlete that performed the activity, the activity type associated with the activity, the date and/or period of time during which the activity took place, the device type that was used to record the activity data, and the equipment used by the athlete during the activity. In some embodiments, the information associated with each activity may include attributes associated with the activity that were input by an athlete and/or attributes associated with the activity that were inferred from the recorded data. In some embodiments, the information associated with each activity is stored by activity data aggregation server 106 in an activity table that comprises an SQL database. Activity data aggregation server 106 is configured to store the set of GPS data (e.g., a set of GPS/Lat-Lng data points) and a corresponding auxiliary data (e.g., barometric/elevation data, timestamps, watts, heart rates, power, etc.) associated with (e.g., each recorded GPS data point along) each activity. In some embodiments, the set of GPS data and a corresponding set of auxiliary data associated with each activity are stored by activity data aggregation server 106 in a virtual hard drive (e.g., Amazon Simple Storage Service) associated with dynamically expanding storage availability. Activity data aggregation server 106 is configured to process the data received for each activity and perform spatial indexing for each activity based on the set of GPS data associated with the activity. In some embodiments, in performing spatial indexing, the information from the activity table and the GPS and corresponding auxiliary data from the virtual hard drive are put together and recorded for each recorded GPS data point and put into a PostGIS database or other spatially enabled and indexed data structure. Activity data aggregation server 106 is configured to send the activity encoding and model prompting server 108.

Activity encoding and model prompting server 108 is configured to train an autoencoder for fine-tuning an LLM. In various embodiments, the model design can be broken into two primary stages: first, activity encoding and modeling prompting server 108 is configured to train an autoencoder to generate a custom lexicographical vocabulary, and second, activity encoding and modeling prompting server 108 is configured to fine-tune an LLM to learn the custom lexicographical vocabulary to perform domain-specific queries.

In this first stage, activity encoding and modeling prompting server 108 is configured to train an autoencoder to represent high-dimensional, structured data associated with user activities into encoded words of a bounded/fixed length.

In various embodiments, the autoencoder is an Ideographic Contrastive Autoencoder (ICAE). The ICAE is trained on a large set of structured data. The ICAE comprises an encoder network, a decoder network, and a bottleneck layer. The encoder network encodes the input structured data into a continuous N dimensional tensor (N being the size of the last hidden layer). The bottleneck layer converts that tensor into a fixed X dimensional discrete vector (where X is a configurable length of desired words). Specific examples of X are 6 and 10. The bottleneck layer may also be referred to as the "character based latent space." The decoder network is used to convert an encoded word back into the original structured data. The ICAE model is trained to minimize the reconstruction loss of passing examples through the pipeline as well as minimize the distance between training examples with similar features in the character-based latent space. For example, the distance in one training example is the Euclidean distance between the numeric representations of each character, where 1 is equivalent to A, 2 to B and so on.

In various embodiments and as will be described in further detail below, the ICAE is trained on structured data that comprises features that are extracted from user activities (and/or the users that had performed the activities) that were recorded by devices such as device 102 and that were aggregated at activity data aggregation server 106. For example, a set of features that may be extracted from a recorded activity may include one or more of the following: average speed, maximum speed, distance, elevation gain, moving time, elapsed time, average grade, maximum grade, average cadence, maximum cadence, average heart rate, maximum heart rate, whether the activity was part of a race or not, and whether the activity was part of a commute or not. In particular, the ICAE is trained to receive a set of input features (e.g., associated with a recorded activity) and to output a corresponding encoded "word" of a fixed length ("character-based latent space" or simply "latent space"). The latent space is structured such that each "word" generated from the ICAE represents a semantically meaningful abstraction of the input data. Each dimension in the latent space represents interpretable tokens (letters/characters) that form the "word" associated with each input. The ICAE model is trained in such a way that words with similar lettering/series of characters e.g., AA and AB, have similar representations in their decoded data (e.g., reconstructed sets of features).

After constructing the custom lexicographical vocabulary through training the ICAE, activity encoding and model prompting server 108 is configured to fine-tune a foundational (e.g., third-party) machine learning model in two phases: domain adaptation and task-specific learning. The first domain adaptation phase helps the LLM learn the custom lexicographical vocabulary by feeding it training sequences of structured data's written word descriptions and their corresponding words that have been encoded by the trained ICAE. This allows the LLM to learn the custom lexicographical vocabulary. In particular, the training data used to fine-tune the LLM for domain adaptation to learn the custom lexicographic vocabulary comprises words encoded by the trained ICAE from sets of input features that have been extracted from recorded activities that were recorded by devices such as device 102 and that were aggregated at activity data aggregation server 106. After the domain adaptation stage is completed, the second task-specific learning phase fine-tunes the LLM to handle domain-specific queries/requests (e.g., queries/requests that include words encoded by the ICAE), such as, for example, forecasting activity sequences or summarizing user behavior. In some embodiments, the training data used to fine-tune the LLM for task-specific learning also comprises words encoded by the trained ICAE from sets of input features that have been extracted from recorded activities that were recorded by devices such as device 102 and that were aggregated at activity data aggregation server 106.

After the LLM has been fine-tuned using the custom lexicographical vocabulary associated with the ICAE, the ICAE and LLM can be used in inference to perform tasks for which the LLM had been fine-tuned. During inference, activity encoding and model prompting server 108 is configured to receive queries related to one or more users/athletes from devices (e.g., device 102 or another device that is not shown in FIG. 1). Activity encoding and model prompting server 108 is configured to determine the task (e.g., activity summarization, activity prediction) that is requested by the query and then obtain a set of historical recorded activities that is needed to perform the task. For example, activity encoding and model prompting server 108 is configured to query activity data aggregation server 106 for the features associated with each historical recorded activity that matches the requested task and/or set of users. Then, activity encoding and model prompting server 108 is configured to input the set of features associated with each matching historical recorded activity (and/or features associated with the user(s) themselves) into the trained ICAE encoder to obtain a corresponding encoded word. Next, activity encoding and model prompting server 108 is configured to generate a prompt related to the requested task that includes the encoded word(s). Activity encoding and model prompting server 108 is configured to prompt the fine-tuned LLM using this prompt to receive a corresponding output from the LLM. Where the LLM's output comprises word(s) that match the configured attributes of the ICAE, activity encoding and model prompting server 108 calls on the ICAE decoder to then translate such word(s) of the LLM's output into a real-valued feature space related to activities, which can then be programmatically converted into human-interpretable results (e.g., English sentences that describe the activities) that are presented at a user interface (e.g., at the requesting device or at a different device).

As shown with FIG. 1, an ICAE is trained to represent complex, structured data as compact words, which succinctly encodes meaningful patterns that in turn facilitate efficient learning by an LLM. The LLM is then fine-tuned on the words/vocabulary that are encoded by the ICAE encoder. Then, at inference, the fine-tuned LLM can accept a prompt with ICAE encoded word(s) in a bounded input token space and also produce an output (e.g., with one or more encoded words) in a bounded output token space, which reduces the overall cost and complexity of running the LLM.

Figure 2:
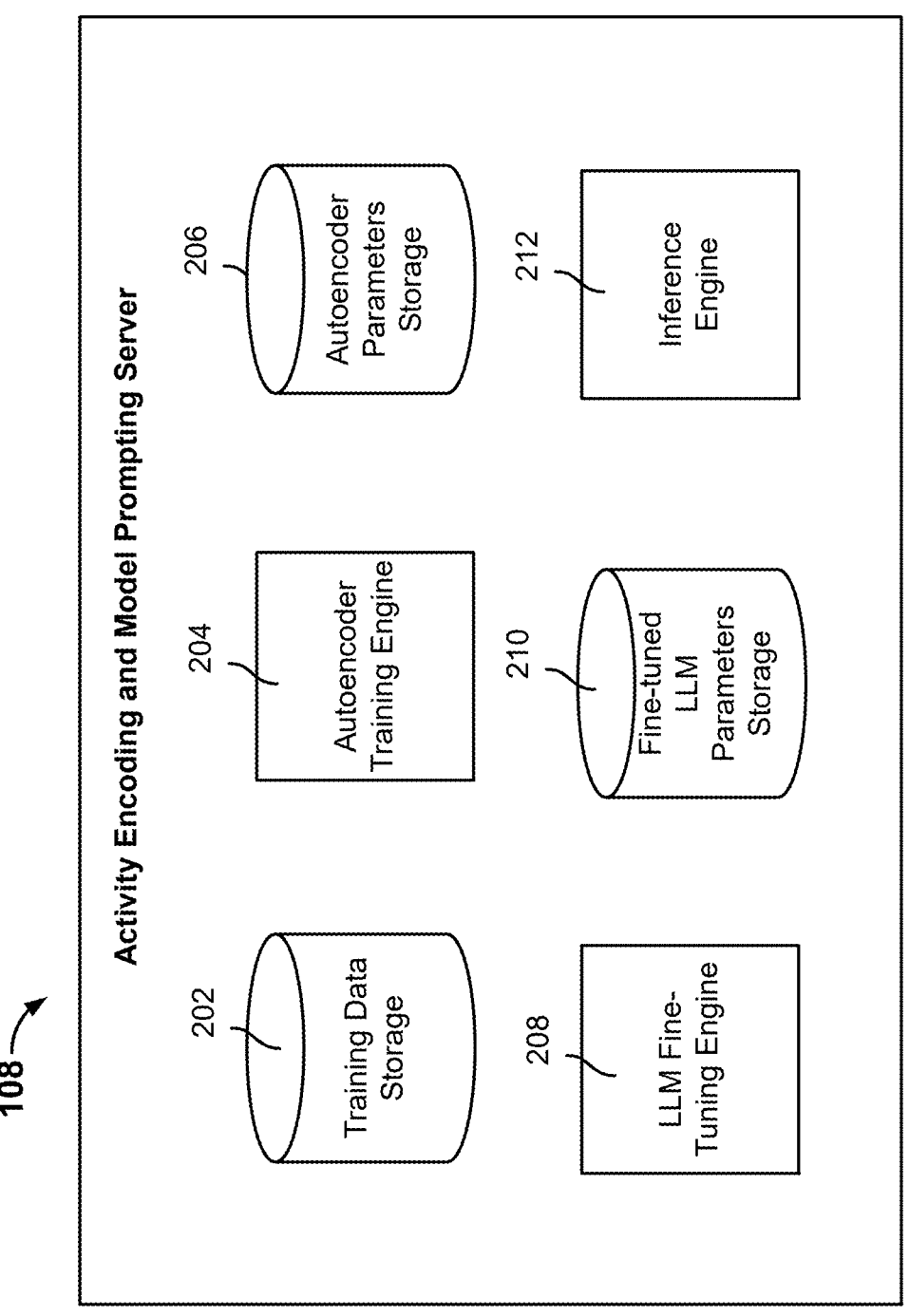
FIG. 2 is an example of an activity encoding and model prompting server in accordance with some embodiments.

FIG. 2 is an example of an activity encoding and model prompting server in accordance with some embodiments. In some embodiments, activity encoding and model prompting server 108 of FIG. 1 may be implemented, at least in part, using the example activity encoding and model prompting server. In the example of FIG. 2, the activity encoding and model prompting server includes training data storage 202, autoencoder training engine 204, autoencoder parameters storage 206, LLM fine-tuning engine 208, fine-tuned LLM parameters storage 210, and inference engine 212. In some embodiments, each of training data storage 202, autoencoder training engine 204, autoencoder parameters storage 206, LLM fine-tuning engine 208, fine-tuned LLM parameters storage 210, and inference engine 212 can be implemented, for example, as distinct or integrated software components, which can include module(s), package(s), and/or other distinct or integrated sub-components to provide an executable computer program that can perform these described functions when executed on a processor, and can be implemented using a programming language such as Scala, Go, Java, Python, Objective C, and/or other programming languages. An example hardware computing environment to execute the components of FIG. 2 includes a cloud computing service, such as Amazon's Web Services®.

Training data storage 202 is configured to store training data for training the autoencoder (e.g., ICAE) for which the parameters thereof are stored at autoencoder parameters storage 206 and for training the machine learning model (e.g., LLM) for which the parameters thereof are stored at fine-tuned LLM parameters storage 210. In some embodiments, training data storage 202 includes historical activity data that has been aggregated by an activity data aggregation server (e.g., activity data aggregation server 106 of FIG. 1). In some embodiments, training data storage 202 includes sets of features derived from historical activity data that has been aggregated by an activity data aggregation server (e.g., activity data aggregation server 106 of FIG. 1). As mentioned above, a set of example features that can be derived from a recorded activity includes one or more of the following dimensions: average speed, maximum speed, distance, elevation gain, moving time, elapsed time, average grade, maximum grade, average cadence, maximum cadence, average heart rate, maximum heart rate, whether the activity was part of a race or not, and whether the activity was part of a commute or not.

In some embodiments, training data storage 202 also stores for each set of features extracted from a historical user activity, a modified version of the set of features. For example, the modified version of the set of features is generated by injecting a small amount of noise across one or more features/dimensions of the reference set of features. A modified version of a reference set of features is sometimes referred to as an "artificial" set of features because it is not derived from an instance of a real/recorded user activity. A modified version of a reference set of features is intended to be different but still similar to the reference set of features from which it was derived and as will be described in further detail below, pairs of reference and corresponding sets of features are used to train the ICAE encoder to ensure that the pair of encoded words are similar.

In some embodiments, training data storage 202 also stores for each set of features extracted from a historical user activity, a pair of a text-based description of the historical user activity and a corresponding word that has been encoded by the trained ICAE from that set of features. In some embodiments, the text-based description of the historical user activity can be programmatically generated from the activity's set of features. For example, programmatically generating the text-based description of the historical user activity can be performed by updating the placeholder values for one or more activity features/dimensions (e.g., average speed, maximum speed, distance) of a (e.g., predetermined) template text-based description with the actual features/dimensions of the activity. As will be described in further detail below, pairs of encoded words (encoded from sets of features associated with historical user activities) and corresponding text-based descriptions are used to fine-tune an LLM in the domain adaption phase to learn the custom lexicographical vocabulary of the ICAE.

In some embodiments, training data storage 202 also stores pairs of sets of word(s) that have been encoded by the trained ICAE from corresponding set(s) of features that have been derived from historical user activities and corresponding reference texts that are associated with a specified task that is performed based on those set(s) of features. Each set of encoded words are encoded from sets of features derived from historical user activities that have been selected based on a specified task (e.g., weekly activity plan generation, single long/interval/recovery activity recommendations, activity history summarization and analysis, specific activity fitness analysis, commute detection, anomaly detection, injury/sickness detection, marathon/race plan generation, marathon/race time prediction, group workout generation, time-based fitness analysis). The reference text that is generated for each of a set of words selected for the specified task can be manually or otherwise programmatically generated by performing the specified task to the corresponding sets of features derived from historical user activities. As will be described in further detail below, the reference text associated with performing a specified task on a set of encoded words may comprise a text-based description that provides a human-readable description of one or more activities and/or includes encoded words that represent actual or recommended/predicted/hypothetical user activities. As will be described in further detail below, pairs of sets of encoded words and reference texts are used to fine-tune the LLM in the task-specific learning phase to handle domain-specific queries/requests that include encoded word(s) in the prompts.

Autoencoder training engine 204 is configured to train an autoencoder to encode a high-dimensional, structured set of input features (e.g., associated with a user activity) into a word of a fixed length and such that similar sets of features will be encoded into similar words. Autoencoder training engine 204 is configured to train the autoencoder to decode an input word into a high-dimensional, structured reconstructed set of features. In various embodiments, autoencoder training engine 204 trains an ICAE type of autoencoder. Prior to training, autoencoder training engine 204 is configured to initialize the ICAE with configurable hyperparameters such as a numerical range and a word length. The "numerical range" hyperparameter refers to the range of numbers (e.g., 0-23) from which numbers thereof will be used by the bottleneck layer to represent the encoded word of the specified word length of a set of input features. The "word length" hyperparameter refers to the count of numbers/characters in a series/sequence (e.g., 6 or 10) in a word into which the bottleneck layer will encode the set of input features. In some embodiments, the count of integers within the numerical range should match to the size of the nonnumerical character space (e.g., the Greek alphabet system, which includes 24 characters) to which an encoded word, which comprises a word length series of numbers from the submitted numerical range, will be mapped. While conventionally, the autoencoder will encode input features into real numbers within the given "numerical range," including decimal values (e.g., 8.7), various embodiments herein will round the encoded real number into the nearest integer. This rounding step is not typical of autoencoders. In some embodiments, the rounding step is performed by using the cosine function as an additional penalty when the network is trained. The rounding step is needed in order to be able to map the encoded value to a discrete, fixed-length nonnumerical space in the bottleneck layer. For example, each rounded integer within the selected numerical range should be mapped on a one-to-one basis to a corresponding character in the selected non-numerical character space (e.g., in the Greek alphabet system, the value of "0" should be mapped to "a," the value of "1" should be mapped to "B," the value of "2" should be mapped to "γ," and so forth). In some embodiments, the non-numerical character space should be selected to be one in which the LLM to later fine-tune has not been extensively trained and therefore has not learned predetermined ICAE character usage patterns, relationships between the ICAE characters, or relationships between ICAE characters and other characters in the LLM's token space.

In some embodiments, autoencoder training engine 204 is configured to train the ICAE using the training data (e.g., that has been stored at training data storage 202) comprising sets of input features that have been extracted from historical user activities uploaded by various athletes/users. In some embodiments, autoencoder training engine 204 is configured to train the ICAE based on a combination of two penalties (e.g., the minimization of the weighted sum of the two penalties) determined from the ICAE's processing of the training data: 1) the similarity penalty and 2) the reconstruction penalty. To obtain the "similarity penalty" for a particular reference set of input features from the training data, autoencoder training engine 204 is configured to feed the reference set of input features from the training data into the encoder network of the ICAE to generate a first/reference word. As mentioned above, the output from the bottleneck layer is a series of numbers and each number is then mapped to a corresponding character in the selected non-numerical character space to yield a corresponding series of characters, which forms a "word." Then, the modified version of the reference set of input features from the training data (e.g., the modification comprises an injection of random noise across one or more dimensions of the input features), which comprises a set of input features similar to the reference set, is fed into the encoder network to generate a second word. For example, autoencoder training engine 204 is configured to determine the (e.g., Euclidean) distance between the first/reference and the second word to determine the similarity penalty. To obtain the "reconstruction penalty" for the particular reference set of input features from the training data, autoencoder training engine 204 is configured to pass/ feed the first/reference word that was encoded from the reference set of input features by the ICAE encoder network into the ICAE decoder network to obtain a reconstructed set of features. For example, autoencoder training engine 204 is configured to determine the comparison between the reference set of input features and the reconstructed set of features to determine the reconstruction penalty. Autoencoder training engine 204 is then configured to adjust the parameters (e.g., associated with the ICAE encoder network, bottleneck layer, and decoder network) of the ICAE that are stored at autoencoder parameters storage 206 based on a combination of the similarity penalty and the reconstruction penalty. Autoencoder training engine 204 is then configured to continuously adjust the parameters of the ICAE based on various reference sets of input features from the training data such as described above until the combination of the similarity penalty and the reconstruction penalty (i.e., the loss function) meets a set of criteria (e.g., falls below a threshold value and/or remains substantially consistent over time/ iterations). Put another way, autoencoder training engine 204 is configured to continuously adjust the parameters of the ICAE until a configured goal of decreasing/minimizing the loss function is achieved.

LLM fine-tuning engine 208 is configured to fine-tune an LLM to learn the custom lexicographical vocabulary that is used by the trained ICAE and to then perform specific tasks that involve words encoded by the ICAE encoder network. As mentioned above, the LLM is fine-tuned in two phases: domain adaptation and task-specific learning. In some embodiments, LLM fine-tuning engine 208 is configured to fine-tune the LLM for domain adaptation learning using training data (e.g., that has been stored at training data storage 202) that comprises words encoded by the trained ICAE from sets of features that have been extracted from historical user activities uploaded by various athletes/users. For the purpose of creating diverse training data, the historical user activities that are used to fine-tune the LLM may be different than the historical user activities that were used by autoencoder training engine 204 to train the ICAE. In the domain adaptation fine-tuning, LLM fine-tuning engine 208 is configured to prompt the LLM to describe a user activity that is represented by an encoded word from the training data. Then, LLM fine-tuning engine 208 is configured to determine a domain adaptation penalty based on a comparison between the output text-based description from the LLM and a text description of the reference/set of input features (from the training data) from which the encoded word was encoded using the ICAE. LLM fine-tuning engine 208 is configured to adjust the parameters of the LLM that are stored at fine-tuned LLM parameters storage 210 based on the domain adaptation penalty. LLM fine-tuning engine 208 is configured to continuously perform domain adaptation fine-tuning of the LLM until the domain adaptation penalty meets a set of criteria (e.g., falls below a threshold value and/or remains substantially consistent over time/iterations).

After the domain adaptation stage is completed, LLM fine-tuning engine 208 is configured to fine-tune the LLM for task-specific learning to handle one or more types of task-specific queries/requests (e.g., queries/requests that include words encoded by the ICAE). Example types of tasks include weekly activity plan generation, single long/ interval/recovery activity recommendations, activity history summarization and analysis, specific activity fitness analysis, commute detection, anomaly detection, injury/sickness detection, marathon/race plan generation, marathon/race time prediction, group workout generation, time-based fitness analysis, etc. In some embodiments, LLM fine-tuning engine 208 is configured to fine-tune the LLM for task-specific learning using the training data (e.g., that has been stored at training data storage 202) comprising words encoded by the trained ICAE from input sets of features that have been extracted from historical user activities uploaded by various athletes/users. In the task-specific learning fine-tuning, LLM fine-tuning engine 208 is configured to prompt the LLM to perform a specified type of task based on a set of one or more encoded words from the training data, where each encoded word represents the set of features of a user activity. Then, LLM fine-tuning engine 208 is configured to determine a task-specific learning penalty based on a comparison between the output from the LLM and a reference text (e.g., the reference text represents a correct/desirable performance result of the task by the LLM). LLM fine-tuning engine 208 is configured to adjust the parameters of the LLM that are stored at fine-tuned LLM parameters storage 210 based on the task-specific learning penalty. LLM fine-tuning engine 208 is configured to continuously adjust the parameters of the LLM in the task-specific learning fine-tuning phase until the task-specific learning penalty meets a set of criteria (e.g., falls below a threshold value and/or remains substantially consistent over time/iterations).

In some embodiments, in task-specific learning, LLM fine-tuning engine 208 is configured to output a response that includes encoded word(s) that encode the features of one or more user activities that satisfy the requested task (e.g., weekly activity plan generation, single long/interval/ recovery activity recommendations, activity history summarization and analysis, specific activity fitness analysis, commute detection, anomaly detection, injury/sickness detection, marathon/race plan generation, marathon/race time prediction, group workout generation, time-based fitness analysis) and in some other embodiments, LLM fine-tuning engine 208 is configured to fine-tune the LLM to output a response comprising a text-based description of the one or more user activities (and not the encoded words thereof) that satisfy the requested task. The advantage of the former approach of fine-tuning the LLM to output encoded word(s) is that, during inference, the token space of the LLM's output would not significantly exceed one or more instances of the fixed character length of words and would therefore limit the amount of computation that the LLM would need to perform. Each of these encoded words output by the LLM would then need to be passed through to the decoder network of the ICAE to reconstruct the corresponding sets of activity features, which would then need to be programmatically converted (e.g., using a text-based template for the requested task) to yield the (e.g., human readable) text-based description of the LLM's output of encoded word(s), which would then be presented at a user interface. The advantage of the latter approach of fine-tuning the LLM to, during inference, directly output (e.g., human readable) text-based description of the one or more activities that satisfy the requested task is that the decoder network would need not be used for decoding, which would allow the LLM's output to be directly presented at a user interface.

Inference engine 212 is configured to receive a requested task associated with one or more users and then obtain one or more recorded user activities that match the task and user(s). Inference engine 212 is configured to obtain the sets of features corresponding to the obtained one or more recorded user activities and feed the sets of features into the trained ICAE encoder (e.g., as represented by the adjusted ICAE parameters stored by autoencoder parameters storage 206) to obtain a corresponding set of encoded words. Based on the type of the requested task, inference engine 212 can obtain a prompt template or otherwise generate a prompt corresponding to that task that includes the encoded words (to represent the respective user activities in a compact input token space). Inference engine 212 then feeds the prompt to the fine-tuned LLM (e.g., as represented by the adjusted fine-tuned LLM parameters stored by fine-tuned LLM parameters storage 210). Where the LLM's output comprises word(s), inference engine 212 is configured to feed the LLM output words into the ICAE decoder network to then translate the words back into real-valued, reconstructed features associated with one or more user activities. In a first example use case, the reconstructed activity features are then programmatically converted (e.g., using corresponding templates) into a text-based message, which produces human-interpretable results that are presented by inference engine 212 at a user interface as the response to the requested task. In a second example use case, the reconstructed activity features are converted into a text-based description and then the activity description is included in recommendation for an activity challenge for the user to perform. The recommendation may be presented along with other visualizations that may be generated from or based on the reconstructed activity features, such as, for example, an overlay of a possible route that is consistent with the reconstructed activity features on a map presentation. Where the LLM's output directly comprises a text-based message of human-interpretable results (and does not include encoded word(s)), inference engine 212 can directly present the LLM output at a user interface as the response to the requested task.

Figure 3:
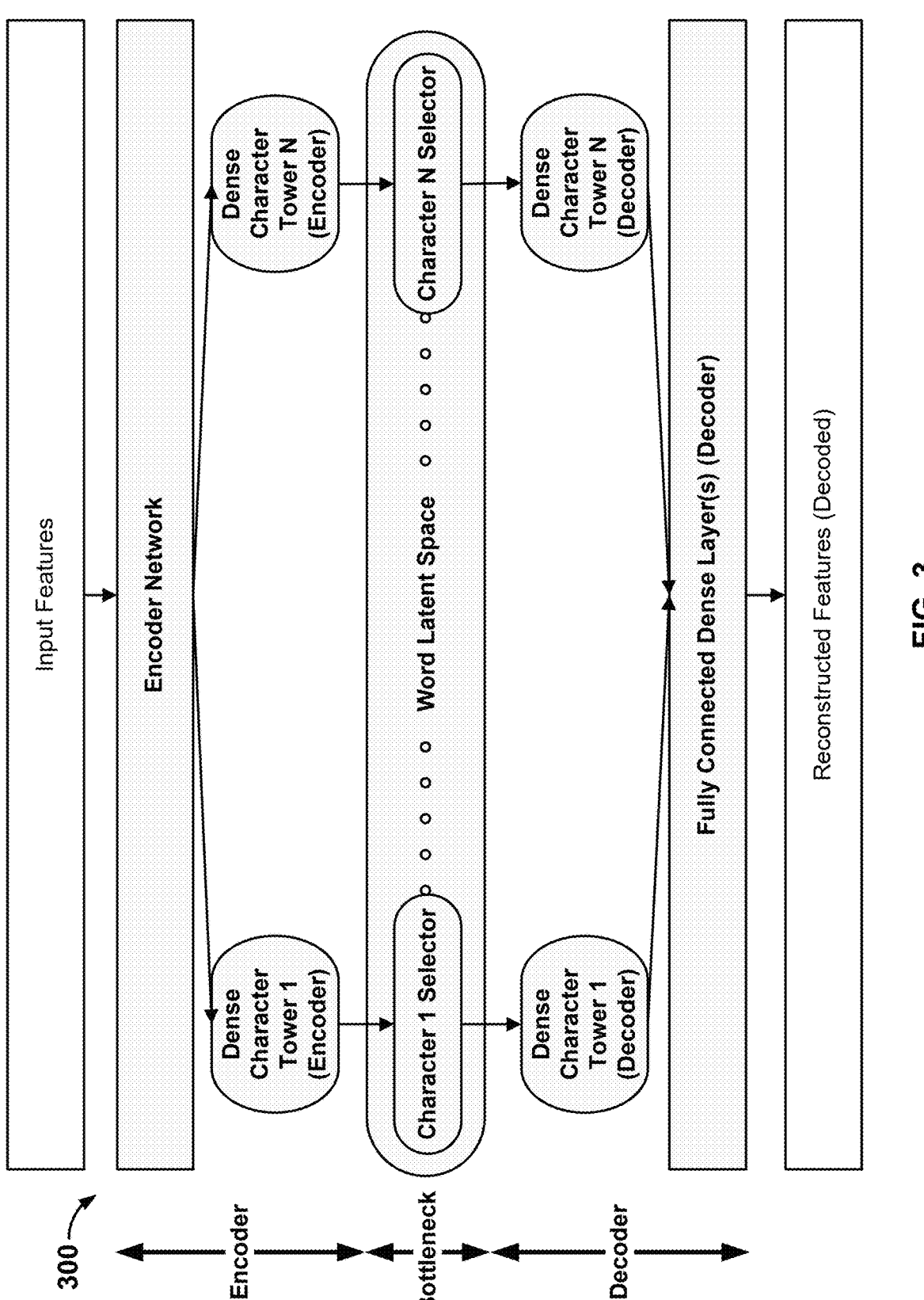
FIG. 3 is a diagram showing an example of an ideographic contrastive autoencoder (ICAE) in accordance with some embodiments.

FIG. 3 is a diagram showing an example of an ideographic contrastive autoencoder (ICAE) in accordance with some embodiments. As shown in FIG. 3, ICAE 300 includes an encoder network (comprising fully connected dense layer(s)), a bottleneck layer (which is also referred to as the "word latent space"), and a decoder network (comprising fully connected dense layer(s)). The ICAE architecture builds on a simple autoencoder by introducing a unique latent space and a contrastive loss function. The word latent space is shaped by applying a sigmoid activation to the latent input, then scaling it by the desired number of characters in the target language. To encourage values to be close to integers, a regularization term using the cosine function penalizes deviations from whole numbers.

As described above, prior to training an ICAE such as ICAE 300, the ICAE is initialized with configurable hyper-parameters such as a numerical range and a word length (e.g., 6 or 10). The "numerical range" hyperparameter refers to the range of numbers (e.g., 0-23) from which numbers thereof will be used by the word latent space to represent the encoded word of a set of input features. The "word length" hyperparameter refers to the count of numbers/characters in a series/sequence in a word into which the bottleneck layer will encode the set of input features.

As shown in ICAE 300, each tower of "Dense Character Tower 1, . . . , N (Encoder)" takes all of the input activity features and consolidates them down to a single number in the desired numerical range. Each tower consists of fully connected dense layers with weights that are completely independent from the weights of the other towers, and initialized randomly. In this way, each dense character tower is able to "learn" to represent a distinct element of the input features. In a specific example, one could imagine that one tower learns to represent the type of an activity (e.g., a swim, run, ride, hike), while another learns to encapsulate the distance of an activity.

Each component of "Character 1, . . . , N Selector" of ICAE 300 takes as input the single number in the desired numerical range from the corresponding dense character tower. It effectively rounds this number to the nearest whole integer (e.g., using a regularization term of a cosine function that penalizes deviations from whole numbers), and then derives a particular character in the lexicographical vocabulary (e.g., the selected non-numerical character space) using a 1:1 mapping between the integers in the numerical range and the characters in the custom lexicographical vocabulary.

Each tower of "Dense Character Tower 1, . . . , N (Decoder)" consists of fully connected dense layers. Similar to the encoder network, each tower is independent of each other, initialized with different random weights that are updated independently of each other. The goal of these towers is to be able to convert the input character from the lexicographical vocabulary (e.g., the selected non-numerical character space) into a series of numbers. These numbers then get combined with the output of all of the other dense character towers as part of one final fully connected dense layer, which attempts to reconstruct the (e.g., activity) features that were input to the encoder network.

In training ICAE 300, the contrastive loss enhances learning by generating a slightly noised duplicate of each training example, perturbing its continuous features. Put another way, each reference set of features (associated with a historical user activity) in the training data for the ICAE is modified to include some noise across one or more of its dimensions to create a corresponding modified ("noised") version/embedding. The loss penalizes the distance between the original/reference and noised embeddings, reinforcing the similarity of embeddings with shared characteristics (e.g., features/dimensions associated with user activities). This approach simplifies the downstream learning process for the LLM, ensuring that the LLM will capture the nuanced relationships within the latent space more effectively.

In FIG. 3, the "word length" hyperparameter is set to the value of N and so each word that the encoder of ICAE 300 encodes from input features (e.g., associated with a user activity) includes N numerical values within the "numerical range" hyperparameter and then this series of N numerical values will be mapped to N non-numerical values. Similarly, an N-length word can be fed into the decoder of ICAE 300 for the decoder to decode the word into reconstructed features (e.g., associated with a user activity).

FIG. 4 is a flow diagram showing an embodiment of a process for training an autoencoder and for fine-tuning a machine learning model. In some embodiments, process 400 may be implemented, at least in part, using activity encoding and model prompting server 108 of FIG. 1.

At 402, a set of training data is obtained from a set of user activity data. Training data to be used to train the autoencoder and the machine learning model includes features extracted from recorded user activities. As described above, a recorded user activity may include a run, a bike ride, or a swim. Each recorded user activity may include data that represents the whole activity (e.g., average metrics) as well as streams of data (e.g., speed, elevation, heartrate, GPS, etc.) that were measured at various times/points within the user activity. In some embodiments, the training data also includes profile data (e.g., age, gender, location) of the users/athletes that had performed the recorded user activities.

At 404, an autoencoder is trained using the set of training data to obtain a custom lexicographical vocabulary. In various embodiments, the autoencoder is an ICAE (e.g., ICAE 300 of FIG. 3). As will be described in further detail below, a first subset of the training data is used to train the ICAE to encode two similar sets of features (representing two similar user activities) into similar words. The first subset of the training data is also used to train the ICAE to decode a given word into a corresponding reconstructed set of features (representing a user activity). The representation of sets of features of user activities and their corresponding words encoded by the trained ICAE form the custom lexicographical vocabulary.

At 406, a machine learning model is fine-tuned to perform a specific task based at least in part on the custom lexicographical vocabulary. In various embodiments, the machine learning model is an LLM. As will be described in further detail below, a second subset of the training data as well as words encoded by the trained ICAE are used to fine-tune the LLM to learn (domain adapt) the custom lexicographical vocabulary of the ICAE. Additionally, the second subset (or even, a different, third subset) of the training data is used to fine-tune the LLM, having been adapted to the custom lexicographical vocabulary, to perform specific tasks using prompts that represent one or more user activities in the compact forms of word encoded by the ICAE.

FIG. 5 is a flow diagram showing an example process of training an ICAE in accordance with some embodiments. In some embodiments, step 404 of process 400 of FIG. 4 may be implemented, at least in part, using process 500. In some embodiments, process 500 may be implemented, at least in part, using activity encoding and model prompting server 108 of FIG. 1.

Process 500 describes an example process of training an ICAE on pairs of training data from a training batch and where "batch size" is a configurable hyperparameter of the training process. In actual practice, during the training phase, the ICAE may be trained over one or more training batches of different training data (e.g., using one or more instances of process 500).

At 502, a (next) pair comprising a reference set of input features associated with a user activity and a modified set of input features derived from the reference set of input features is received. As mentioned above, the training data used to train the ICAE (e.g., ICAE 300 of FIG. 3) to develop a custom lexicographical vocabulary includes reference sets of input features that are extracted from recorded user activities. For example, a reference set of input features may include dimensions/attributes/metrics of a recorded user activity (e.g., average speed, maximum speed, distance, elevation gain, moving time, elapsed time, average grade, maximum grade, average cadence, maximum cadence, average heart rate, maximum heart rate, whether the activity was part of a race or not, and whether the activity was part of a commute or not) and, optionally, dimensions/attributes/metrics of the user/athlete (e.g., age, gender, location) that had performed the user activity. Each such reference set of input features is paired with a corresponding modified set of input features, which is generated by adding a small amount of noise across one or more features of the reference set to create a different but similar set of features relative to the reference set.

The following is an example table in which each row includes a reference set of input features derived from a respective user activity:

| MOVING_TIME | DISTANCE | ELEVATION_GAIN | TYPE_int |
|---|---|---|---|
| 900 | 1021.2 | 0 | 2 |
| 6005 | 2004.0 | 92.32 | 2 |
| 1243 | 56759.23 | 1234.3 | 1 |
| 969 | 49125.54 | 19.3 | 0 |

In the example table above, the four input features in each reference set in each row are MOVING_TIME, DISTANCE, ELEVATION_GAIN, and TYPE_int. While not shown in the table, a modified set of input features could have been derived from each reference set by injecting a small amount of noise into one or more of MOVING_TIME, DISTANCE, ELEVATION_GAIN, and TYPE_int features of the reference set.

At 504, the reference set of input features is input into an encoder network of an ICAE to obtain a first word. The first word is encoded by the encoder network of the ICAE from the reference set of input features.

At 506, the modified set of input features is input into the encoder network to obtain a second word. The second word is encoded by the encoder network of the ICAE from the modified set of input features.

At 508, a similarity penalty is determined based on a comparison between the first word and the second word. One of the objectives in training the ICAE is to train the ICAE to encode similar sets of features into similar encoded words. As such, a penalty that is referred to as the "similarity penalty" is determined based on a difference between the first and second words. For example, the similarity penalty comprises the Euclidean distance or the edit distance between the first and second words. For example, to determine the Euclidean distance between two words that are each a series of Greek characters, the Greek alphabet words are first converted to vectors of numbers using the reverse of the same 1:1 mapping that is used to encode the bottleneck layer into a lexicographical word. Then, the Euclidean distance is computed between the numerical vectors. As one of the goals of training the ICAE is to train the encoder network to encode similar sets of input features into similar words, the greater that the similarity penalty is between the reference set of input features and the modified set of input features, which are designed to be similar, the more likely the parameters of the ICAE will need to be adjusted.

In some embodiments, each character in the encoded word has the same significance as the other characters in the same word. Put another way, in such embodiments, the encodings are not hierarchical. Similarly, the Euclidean distance that is determined between the first and second words is unweighted (e.g., the computation of the Euclidean distance between the two words uses only the weight of "1" as the coefficient for the distance between the respective first characters of the two words, uses only the weight of "1" as the coefficient for the distance between the respective second characters of the two words, and so forth).

In some other embodiments, each character in the encoded word has potentially a different significance from the other characters in the same word. For example, characters at different indices/positions within the encoded word would be given different importances/significances/weights. To give an analogy, the encoding can be constructed such that the first character of a word represents activities to be the highest-order representation of an activity, then the second character further sub-classifies activities, etc. In a specific example, the character in the first (e.g., leftmost) position of the encoded word has the most significance, the second character in the second position of the encoded word has the second most significance, and so forth. Put another way, in such embodiments, the encodings are hierarchical. While the specific meaning of the hierarchies at each level will not necessarily be understandable by humans (without using the decoder), the hierarchical nature itself will exist. Specifically, activities that match each other at the first character (or are close together for the first character) will be more similar to each other than activities that match each other at the last character. Activity $\alpha\theta K\xi P\pi\alpha$ would be closer to activity $\alpha\beta\alpha K\pi\xi P$ than activity $\pi\theta K\xi P\pi\alpha$, even though the last six characters all match for the $\pi\theta K\xi P\pi\alpha$ activity (but the first characters are far apart). In order to achieve this, a weighted Euclidean distance should be used as the cost function when training the autoencoder. In contrast to conventional Euclidean distance (which is unweighted), in computing the weighted Euclidean distance between the two words, the distance between the first characters (or characters at whichever position within the word that is associated with the highest significance) will be weighted more heavily than the distance between subsequent (other) characters. Thus, the model inherently learns to ensure that activities that are similar to each other share similar first characters, or it will be heavily penalized otherwise. In a simple example, let's say the model generates 3-character words for activities. The distance between the respective first characters (in this example, characters within a word are given decreasing significance starting from the leftmost character/position) of the first and second words is multiplied by 0.5, the distance between the respective second characters of the first and second words is multiplied by 0.3, and the distance between the respective third characters of the first and second words is multiplied by 0.2. This would be an example of a weighted Euclidean distance cost function for the autoencoder model. And it would ensure the hierarchical nature described above by penalizing the model for not creating this desired hierarchy. All in all, the purpose of this hierarchical encoding construction is to add more signals into the encoding, which would help with the LLM's learning during fine-tuning.

At 510, the first word is input into a decoder network of the ICAE to obtain a reconstructed set of features. The reconstructed set of features represents features of an activity.

At 512, a reconstruction penalty is determined based on a comparison between the reference set of input features and the reconstructed set of features. Another objective in training the ICAE is to train the ICAE to decode a word correctly into a set of features that is represented by the word. As such, a penalty that is referred to as the "reconstruction penalty" is determined based on a difference between the reference set of input features and the reconstructed set of features. As another of the goals of training the ICAE is to train the encoder network to decode a word into the correct set of features from which the word was ended, the greater that the reconstruction penalty is between the reference set of input features and the reconstructed set of features, which should be similar, the more likely the parameters of the ICAE will need to be adjusted.

At 514, an aggregated penalty is determined based on the similarity penalty and the reconstruction penalty. The similarity penalty and the reconstruction penalty are combined to determine a weighted sum ("aggregated penalty") for the pair.

At 516, whether there is at least one more pair of a reference set of input features and a modified set of input features in the current training batch is determined. In the event that there is at least one more pair in the in the current training batch for training the ICAE, control is returned to 502. Otherwise, in the event that there are no more such pairs in the in the current training batch for training the ICAE, control is transferred to 518. In the example of FIG. 5, the ICAE is continued to be trained until there are no more pairs of reference input features and modified input features in the current training batch of the training data that has been selected to use to train the ICAE. Alternatively, while not shown in FIG. 5, the training of the ICAE can also stop once the aggregated penalty falls below a threshold or fails to change (beyond a threshold amount) after a period of time or over a predetermined number of instances of training the ICAE with the pairs of training data.

At 518, parameters of the ICAE are updated based on aggregated penalties. The combined aggregated penalties across the pairs of data in the current training batch is used to update the parameters of the ICAE. For example, if the "batch size" is 100, then the 100 pairs would be fed to the ICAE at a time, and the parameters of the ICAE would be updated based on the combined loss functions run on all 100 pairs of the training batch.

While not described above, in some embodiments, each pair of training data is used to train the ICAE once or more than once. One single pass over the entire training dataset is referred to as an "epoch," and where the number of epochs is a configurable hyperparameter when training the ICAE model.

In some embodiments, the ICAE is continued to be trained (e.g., over instances of process 500) until there are no more pairs of reference input features and modified input features in the training data that has been selected to use to train the ICAE. Alternatively, while not shown in FIG. 5, the training of the ICAE can also stop once the aggregated penalty falls below a threshold or fails to change (beyond a threshold amount) after a period of time or over a predetermined number of instances of training the ICAE with the pairs of training data.

Figure 6:
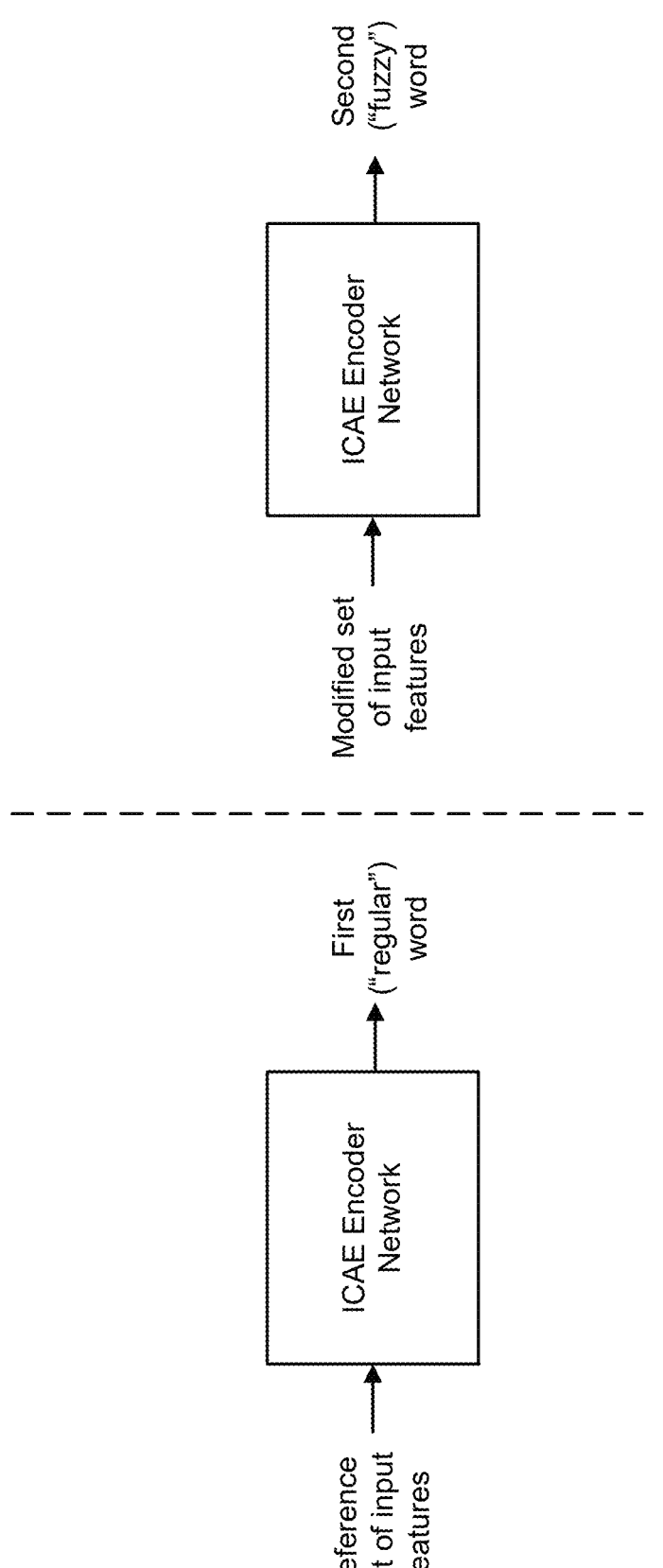
FIG. 6 is a diagram showing an example of determining a similarity penalty for training an ICAE based on training data that includes a reference set of input features and a corresponding modified set of input features.

FIG. 6 is a diagram showing an example of determining a similarity penalty for training an ICAE based on training data that includes a reference set of input features and a corresponding modified set of input features. In some embodiments, the example of FIG. 6 corresponds to steps 504, 506, and 508 of process 500 of FIG. 5. As shown in FIG. 6, in training the ICAE, the reference set of input features is fed into the ICAE encoder network to obtain a corresponding first ("regular") word and then a modified set of input features (that is derived from and similar to the reference set of input features) is fed into the ICAE encoder network to obtain a corresponding second ("fuzzy") word. In this example, the similarity penalty that is used, at least in part, to adjust the parameters of the ICAE is the Euclidean difference between the first and second words.

In one example, the word latent space of the ICAE is chosen to map to the 24 characters of the Greek alphabet and each word is set to be 6 characters in length. As such, in a specific example, the first word that is encoded from a reference set of input features is $\alpha\theta K\xi P\pi\alpha$ and then the second word that is encoded from a corresponding modified set of input features is $\alpha\theta K\pi T\beta H$. So, the similarity penalty computed for this pair would be the Euclidean distance between word $\alpha\theta K\xi P\pi\alpha$ and word $\alpha\theta K\pi T\beta H$. As mentioned above, to determine the Euclidean distance between word $\alpha\theta K\xi P\pi\alpha$ and word $\alpha\theta K\pi T\beta H$, each word would be first converted on a 1:1 basis back to a respective series of integer numbers (in the configured numerical range of the ICAE) and then the Euclidean distance can be computed between the two vectors that include the series of integer numbers.

Figure 7:
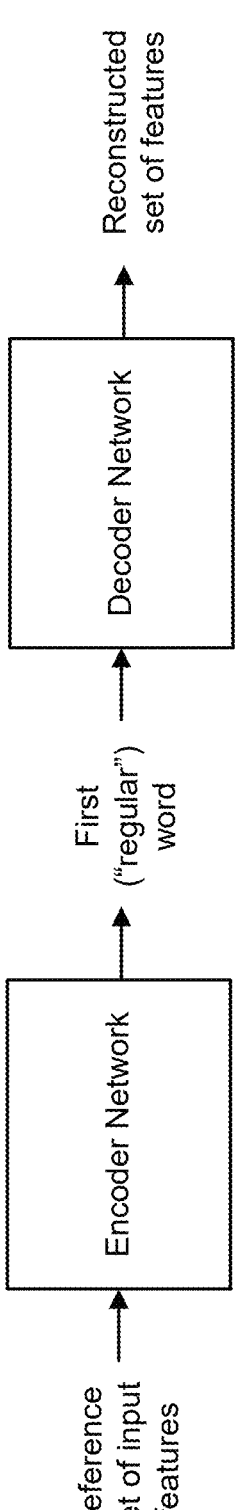
FIG. 7 is a diagram showing an example of determining a reconstruction penalty for training an ICAE based on training data that includes a reference set of input features and a first word that is encoded by the ICAE encoder from the reference set of input features.

FIG. 7 is a diagram showing an example of determining a reconstruction penalty for training an ICAE based on training data that includes a reference set of input features and a first word that is encoded by the ICAE encoder from the reference set of input features. In some embodiments, the example of FIG. 7 corresponds to steps 504, 510, and 512 of process 500 of FIG. 5. As shown in FIG. 7, in training the ICAE, after the reference set of input features is fed into the ICAE encoder network to obtain a corresponding first ("regular") word, the first word is then fed into the ICAE decoder network to obtain a reconstructed set of features. In this example, the reconstruction penalty that is used, at least in part, to adjust the parameters of the ICAE is the difference between the reference set of input features and the reconstructed set of features.

FIG. 8 is a flow diagram showing an example process of fine-tuning an LLM in the domain adaptation phase in accordance with some embodiments. In some embodiments, step 406 of process 400 of FIG. 4 may be implemented, at least in part, using process 800. In some embodiments, process 800 may be implemented, at least in part, using activity encoding and model prompting server 108 of FIG. 1.

Process 800 describes an example process of fine-tuning an LLM in the domain adaptation phase on pairs of training data from a training batch and where "batch size" is a configurable hyperparameter of the training process. In actual practice, during this fine-tuning phase, the LLM may be fine-tuned over one or more training batches of different training data (e.g., using one or more instances of process 800).

At 802, a (next) pair comprising a word encoded from a reference set of input features associated with a user activity and a reference text-based description of the reference set of input features are received. The word is encoded by the trained ICAE based on a reference set of input features associated with a user activity. The reference text-based description corresponding to the word comprises a human-readable/interpretable description of the user activity that is represented by the word. For example, the reference text-based description is programmatically generated by replacing feature placeholders within a predetermined description template with the available features of the reference set of input features extracted from that user activity.

At 804, an LLM is prompted using the word to obtain an output description. In some embodiments, a prompt to the LLM asks the LLM to output a description of the features associated with the user activity that is represented by the word. One example of an LLM that can be fine-tuned is the Mistral7B-Instruct model, although other LLM models can also be used. For example, the size of the input token space to the LLM can be selected to be 200 input tokens. In some embodiments, each input token is a single character in a word (an encoding from the ICAE) in the prompt to the LLM.

At 806, a domain adaptation penalty is determined based on a comparison between the reference text-based description and the output description. A difference is determined based on the expected/reference text-based description of the user activity and the actual LLM output description.

In general, when fine-tuning/training an LLM, the model has the task of "predicting" the next token. So during fine-tuning/training of the model, the training will prompt the model to try to predict what the next token is for a given input. Then, the training process will compare the model's prediction to what the next token actually is. If the tokens are different, the model will be penalized accordingly.

Returning to the context of step 806, for example, the prompt may be "describe the activity $\alpha\theta K\pi T\beta H$"—and the true/expected/reference output is "this is a six mile run at eight minutes per mile pace." If the model predicted/output the description of "this is a six mile run at eight minutes per mile pace," then it would incur no penalty. Whereas if model had predicted/output "this is a three mile walk at twenty minutes per mile pace," then it would incur a bigger penalty. Put another way, the domain adaptation penalty can be computed using a negative log likelihood cost function computed on next-token prediction probabilities over the training samples.

At 808, whether there is at least one more pair of a word and a corresponding reference text-based description in the current training batch is determined. In the event that there is at least one more pair in the in the current training batch for fine-tuning the LLM for domain adaptation, control is returned to 802. Otherwise, in the event that there are no more such pairs in the in the current training batch for fine-tuning the LLM for domain adaptation, control is transferred to 810. In the example of FIG. 8, the LLM is continued to be fine-tuned for domain adaptation until there are no more pairs of words and reference text-based descriptions in the in the current training batch of the training data that has been selected to be used to fine-tune the LLM. Alternatively, while not shown in FIG. 8, the fine-tuning the LLM for domain adaptation can also stop once the domain adaptation penalty falls below a threshold or fails to change (beyond a threshold amount) after a period or over a predetermined number of instances of fine-tuning the LLM for domain adaptation with the pairs of training data.

At 810, parameters of the LLM are updated based on domain adaptation penalties. The combined domain adaptation penalties across the pairs of data in the current training batch is used to update the parameters of the LLM.

Figure 9:
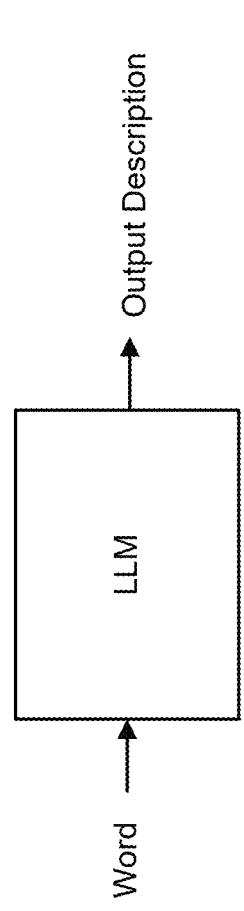
FIG. 9 is a diagram showing an example of determining a domain adaptation penalty for fine-tuning an LLM based on training data that includes a word that is encoded by the trained ICAE from a reference set of input features associated with a user activity and a reference text-based description of the reference set of input features.

FIG. 9 is a diagram showing an example of determining a domain adaptation penalty for fine-tuning an LLM based on training data that includes a word that is encoded by the trained ICAE from a reference set of input features associated with a user activity and a reference text-based description of the reference set of input features. In some embodiments, the example of FIG. 9 corresponds to steps 804, 806, and 808 of process 800 of FIG. 8. As shown in FIG. 9, in fine-tuning the LLM, after the LLM is prompted to describe the features of a user activity that is represented by the word, the LLM outputs an output description. In this example, the domain adaptation penalty that is used, at least in part, to adjust the parameters of the LLM is the difference between the reference text-based description of the reference set of input features and the output description.

For example, a sample prompt to the LLM during domain adaptation fine-tuning may be "Can you retrieve the activity type from the activity representation @αγδTAτ?," where αγδTAτ is the word from the training data and where "The activity type value is Run" is the corresponding reference text-based description.

Figure 10:
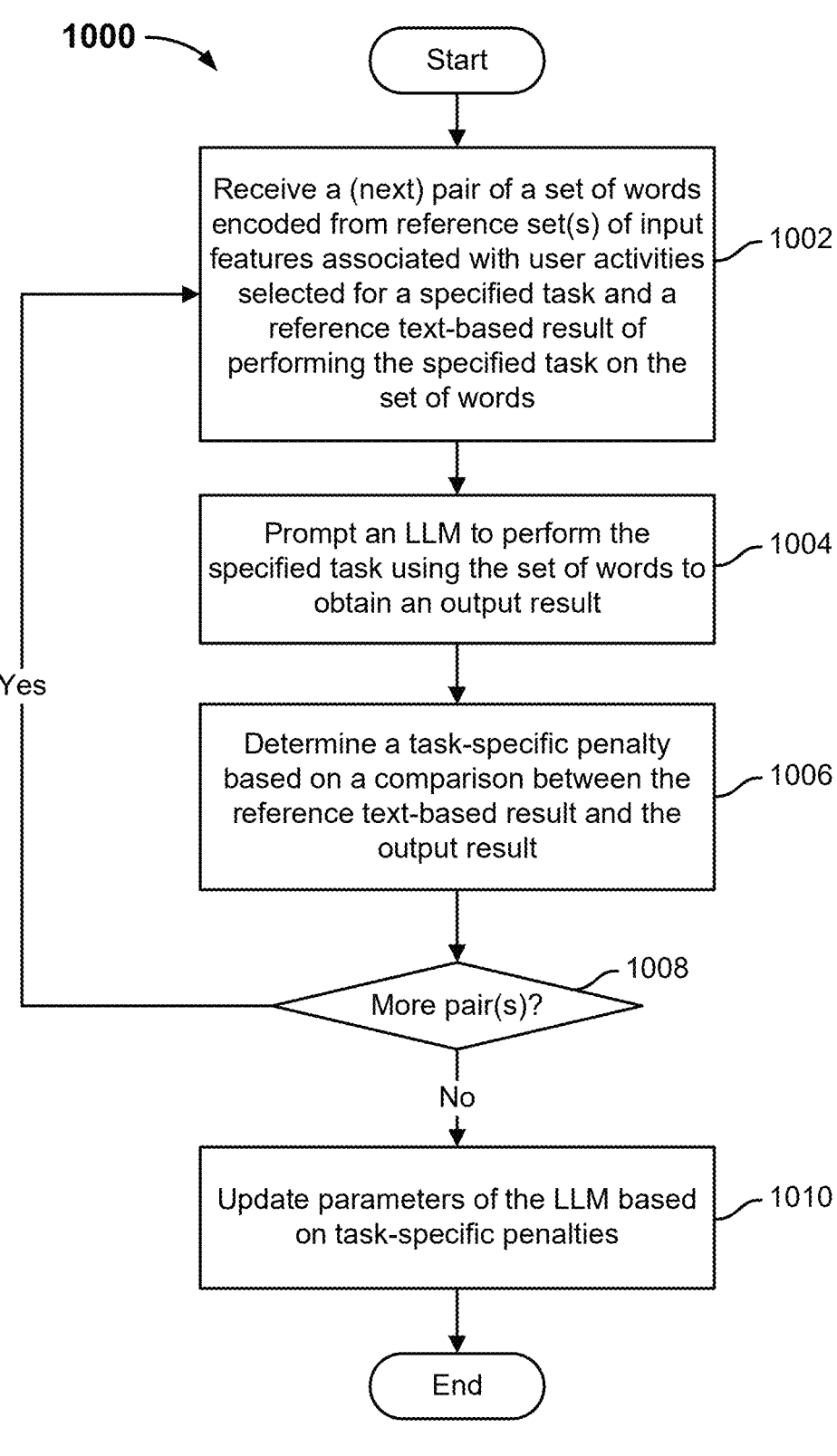
FIG. 10 is a flow diagram showing an example process of fine-tuning an LLM in the task-specific learning phase in accordance with some embodiments.

FIG. 10 is a flow diagram showing an example process of fine-tuning an LLM in the task-specific learning phase in accordance with some embodiments. In some embodiments, step 406 of process 400 of FIG. 4 may be implemented, at least in part, using process 1000. In some embodiments, process 1000 may be implemented, at least in part, using activity encoding and model prompting server 108 of FIG. 1.

Process 1000 describes an example process of fine-tuning an LLM in the task-specific phase on pairs of training data from a training batch and where "batch size" is a configurable hyperparameter of the training process. In actual practice, during this fine-tuning phase, the LLM may be fine-tuned over one or more training batches of different training data (e.g., using one or more instances of process 1000).

At 1002, a (next) pair comprising a set of words encoded from reference set(s) of input features associated with user activities selected for a specified task and a reference text-based result of performing the specified task on the set of words is received. As mentioned above, one example of an LLM that can be fine-tuned is the Mistral7B-Instruct model, although other LLM models can also be used. The training data that is used for fine-tuning the LLM for a specified task type depends on the type of task. As mentioned above, example types of tasks for which the LLM can be fine-tuned may include weekly activity plan generation, single long/ interval/recovery activity recommendations, activity history summarization and analysis, specific activity fitness analysis, commute detection, anomaly detection, injury/sickness detection, marathon/race plan generation, marathon/race time prediction, group workout generation, and time-based fitness analysis. In a first example, for the task type of weekly activity plan generation for a particular user/athlete, the training data may include words encoded by the trained ICAE from historical user activities performed by that user (e.g., over the last month). Also, for the example task type of weekly activity plan generation, the training data also includes the reference text-based result that is a recommended weekly activity plan (e.g., which comprises recommended activities with certain route characteristics or rest to be performed each day of an upcoming week) that was generated or determined based on the user's historical user activities (e.g., performed over the last month). In a second example, for the task type of activity history summarization and analysis for a particular user/athlete, the training data may include words encoded by the trained ICAE from historical user activities performed by that user (e.g., over the last month). Also, for the example task type of activity history summarization and analysis, the training data also includes the reference text-based result that is a summary/ analysis of the athlete's recent activities (e.g., which comprises a summary of the user's average metrics across activities and trends of the user's performances) that was generated or determined based on the user's historical user activities (e.g., performed over the last month).

In some embodiments, the reference text-based result of performing the specified task on the set of words may be manually or programmatically produced, depending on the type of task. For example, take the task type of summarizing a series of activities. Summaries for a given set of activities may be manually generated and where the manual summary write-ups become the "true" labels that the LLM is trying to predict. Alternatively, such ground truth that the LLM is trying to predict could also be programmatically determined. For example, say the task is to predict the next activity given a set of previous activities. The ground truth could be automatically detected by simply seeing which activity a given user "actually" uploaded next (after the set of activities) to the activity data aggregation server.

The reference text-based output in the training data pair may include representations of user activities (e.g., recommended user activities, hypothetical user activities, actual/ historical user activities). In various embodiments, a representation of a user activity in the reference text-based output may be a word that is to be decoded by the ICAE decoder back into a reconstructed set of features associated with the user activity. In some other embodiments, a representation of a user activity in the reference text-based output may be a text-based description (e.g., a human-readable/understandable message/description) of a set of features associated with the user activity. As mentioned above, an advantage of the former approach of representing user activities as words of the ICAE's custom lexicographical vocabulary in the LLM's output is to limit/reduce the number of output tokens to be output by the LLM (because words that encode user activities can be represented using far fewer tokens than the human-readable descriptions of the features of such activities). An advantage of the latter approach of representing user activities directly as human-readable descriptions of the features of such activities in the LLM's output is the lack of the need to call the ICAE to decode the words from the LLM's output to reconstruct the features of the user activities.

At 1004, an LLM is prompted to perform the specified task using the set of words to obtain an output result. In some embodiments, a corresponding predetermined prompt template for each different type of task may be stored. In some embodiments, a predetermined prompt template includes text as well as activity placeholder values that are to be replaced with the words (which encode corresponding user activities) of the training data pair. The multi-valued numeric vectors that are used to represent an ICAE encoded word to the LLM are also referred to as "embeddings."

In some embodiments, a predetermined prompt template may include activity placeholder values arranged in a time series (e.g., such as an activity placeholder for each day in a past week). When a prompt is to be generated based on the words of a particular training data pair, if a word/user activity data is not available corresponding to a certain time interval in a time series (e.g., no user activities were performed on one or more days in a past week), then a predetermined value associated with no activity ("[OFF]") can be inserted in those positions within the prompt. For example, where an ICAE encoded word comprises a series of six Greek characters, the time series portion in a generated prompt that identifies user activities that were performed in the last 11 days may appear as "[OFF] [@θαΘXμΓ, @εβΞΦηΓ] [@ηαKΦιΓ] [OFF] [OFF] [OFF] [@ιΩOβγΓ, @PιHKPB, @PθΘKTB, @δαΞX εΓ]." In the example prompts to the LLM provided herein, the character "@" gets mapped to a specific token by the LLM. So the LLM learns that when it sees "@," the next set (e.g., of six) characters represent an activity. Put another way, in these examples, "@" acts as a delimiter to help the LLM be able to discern the presence of activity embeddings.

The following are example prompts for different types of tasks:

"Which activity would be more difficult for climbing focused biker: @αYνηυΘε or @βθιYKIυ?"

"Is this a long run or an interval workout: @αθKξPπα?"

"For a user with this history [OFF] [@θαΘXμΓ, @εβΞΦηΓ] [@ηαKΦιΓ] [OFF] [OFF] [OFF] [@ιΩOβγΓ, @PιHKPB, @PθΘKTB, @δαΞXεΓ], what would a recovery week look like?"

"For a user with this history: [OFF] [@θαΘXμΓ, @εβΞΦηΓ] [@ηαKΦιΓ] [OFF] [OFF] [OFF] [@ιΩOβγΓ, @PιHKPB, @PθΘKTB, @δαΞXεΓ] how fast do you think they could run the New York Marathon?"

The prompted LLM will then perform the task requested by the prompt and generate a corresponding output result, which may include words/embeddings that represent one or more user requested activities or directly describe such requested activities in a human-readable description, depending on what was requested in the prompt and/or the configured format of the reference text-based result.

At 1006, a task-specific penalty is determined based on a comparison between the reference text-based result and the output result. A difference is determined based on the expected/reference text-based result of the performance of the task and the actual LLM output result to the specified task.

At 1008, whether there is at least one more pair of a set of words and a corresponding reference text-based result in the current training batch is determined. In the event that there is at least one more pair in the current training batch for fine-tuning the LLM for task-specific learning, control is returned to 1002. Otherwise, in the event that there are no more such pairs in the current training batch for fine-tuning the LLM for task-specific learning, control is transferred to 1010. In the example of FIG. 10, the LLM is continued to be fine-tuned for task-specific learning until there are no more pairs of sets of words and reference text-based results in the current training batch of the training data that has been selected to use to fine-tune the LLM. Alternatively, while not shown in FIG. 10, the fine-tuning the LLM for task-specific learning can also stop once the task-specific penalty falls below a threshold or fails to change (beyond a threshold amount) after a period or over a predetermined number of instances of fine-tuning the LLM for task-specific learning with the pairs of training data.

At 1010, parameters of the LLM are updated based on task-specific penalties. The combined task-specific penalties across the pairs of data in the current training batch is used to update the parameters of the LLM.

Figure 11:
FIG. 11 is a diagram showing an example of determining a task-specific penalty for fine-tuning an LLM based on training data that includes a set of words encoded by the trained ICAE from reference set(s) of input features associated with user activities selected for a specified task and a reference text-based result of performing the specified task on the set of words/embeddings.

FIG. 11 is a diagram showing an example of determining a task-specific penalty for fine-tuning an LLM based on training data that includes a set of words encoded by the trained ICAE from reference set(s) of input features associated with user activities selected for a specified task and a reference text-based result of performing the specified task on the set of words/embeddings. In some embodiments, the example of FIG. 11 corresponds to steps 1004, 1006, and 1008 of process 1000 of FIG. 10. While not shown in FIG. 11, each user activity in a set of user activities (associated with one or more users) in the training data that is needed to perform the specified task is encoded by the trained ICAE into a corresponding word. As shown in FIG. 11, the set of word(s) are then included in a prompt that is generated for that specified task. As mentioned above, the set of words may be included in a series that describes user activities performed at each time interval over a window of time. After the LLM is prompted to perform the specified task based on the set of words (or the user activities represented by those words), the LLM outputs an output result. Also, as mentioned above, the output result may either include user activities represented as words/embeddings (to match the representations of the activities in the input) or include human-readable descriptions of such user activities. In this example, the task-specific penalty that is used, at least in part, to adjust the parameters of the LLM is the difference between the reference text-based result and the output result.

FIG. 12 is a flow diagram showing an embodiment of a process for using a trained autoencoder and a fine-tuned machine learning model during inference. In some embodiments, process 1200 may be implemented, at least in part, using activity encoding and model prompting server 108 of FIG. 1.

Process 1200 describes a process of leveraging the trained autoencoder (e.g., ICAE) and the fine-tuned machine learning model (e.g., LLM) (e.g., which were respectively trained and fine-tuned using process 400 of FIG. 4) to perform a task using data related to one or more user activities.

At 1202, a set of user activities is obtained according to a specified task. The request for the specified task identifies the task type and one or more users whose user activities are related to the specified task. Then, one or more user activities that are recorded for the user(s) and that are relevant to the specified task are obtained. For example, different types of tasks may be performed on the user activities of one user or the user activities of multiple users. Also, for example, different types of tasks may require looking up user activities that were recorded during time windows of different lengths (e.g., a first task type may require looking up user activities that were recorded in the last week and a second task type may require looking up user activities that were recorded in the last year).

At 1204, respective sets of input features are obtained from the set of user activities. For each obtained/looked up user activity, a corresponding set of the input features are extracted from that activity. As mentioned above, examples of features include one or more of the following: average speed, maximum speed, distance, elevation gain, moving time, elapsed time, average grade, maximum grade, average cadence, maximum cadence, average heart rate, maximum heart rate, whether the activity was part of a race or not, and whether the activity was part of a commute or not.

At 1206, an encoder network of an autoencoder is used to encode the sets of input features into a set of words. Each set of input features (extracted from a corresponding user activity obtained at step 1202) is fed into the ICAE encoder to obtain a corresponding word. As mentioned, the word comprises a fixed length (e.g., six or ten) of characters in a selected non-numerical character space (e.g., Greek alphabet). In some embodiments, the non-numerical character space in which the word is encoded is not a language (e.g., English) that the LLM has been trained on using a significant amount of training data in that language.

At 1208, a machine learning model is prompted to perform the specified task using the set of words, wherein the machine learning model has been fine-tuned using a custom lexicographical vocabulary associated with the autoencoder. A prompt to request the fine-tuned LLM to perform the specified task is generated to include the set of words to represent their respective user activities. In some embodiments, the prompt for the LLM can be generated similarly to how prompts were generated during the fine-tuning of the LLM (e.g., as described in process 1000 of FIG. 10) to perform this type of task, which is that a predetermined prompt template can be updated to include the set of words of the present request.

At 1210, a message determined based at least in part on an output result from the machine learning model is presented at a user interface. In some embodiments, the LLM's output result is parsed to determine whether the result includes any words/embeddings to be decoded by the ICAE decoder. For example, the LLM's output result can be parsed to determine whether any one or more portions match the template or format of an ICAE encoded word (e.g., a series of Greek characters of a configured character length). If no ICAE encoded word can be parsed from the LLM output results, then the output results may be directly presented at a user interface as the response to satisfy the initial request. If at least one ICAE encoded word is parsed from the LLM output results, then each such word is passed to the ICAE decoder to decode into a corresponding reconstructed set of activity features. In some embodiments, each reconstructed set of features is also programmatically converted into a human-readable text description (e.g., by updating a response template with the reconstructed features) of a corresponding user activity. The human-readable text descriptions of the one or more words included in the LLM output results can then be presented at a user interface as the response to satisfy the initial request. In some embodiments, each reconstructed set of features is also programmatically converted into a human-readable text description along with one or more visualizations (e.g., as route presented on a map) and presented as a recommended activity or recommended challenge as part of a product experience at a user interface.

Figure 13:
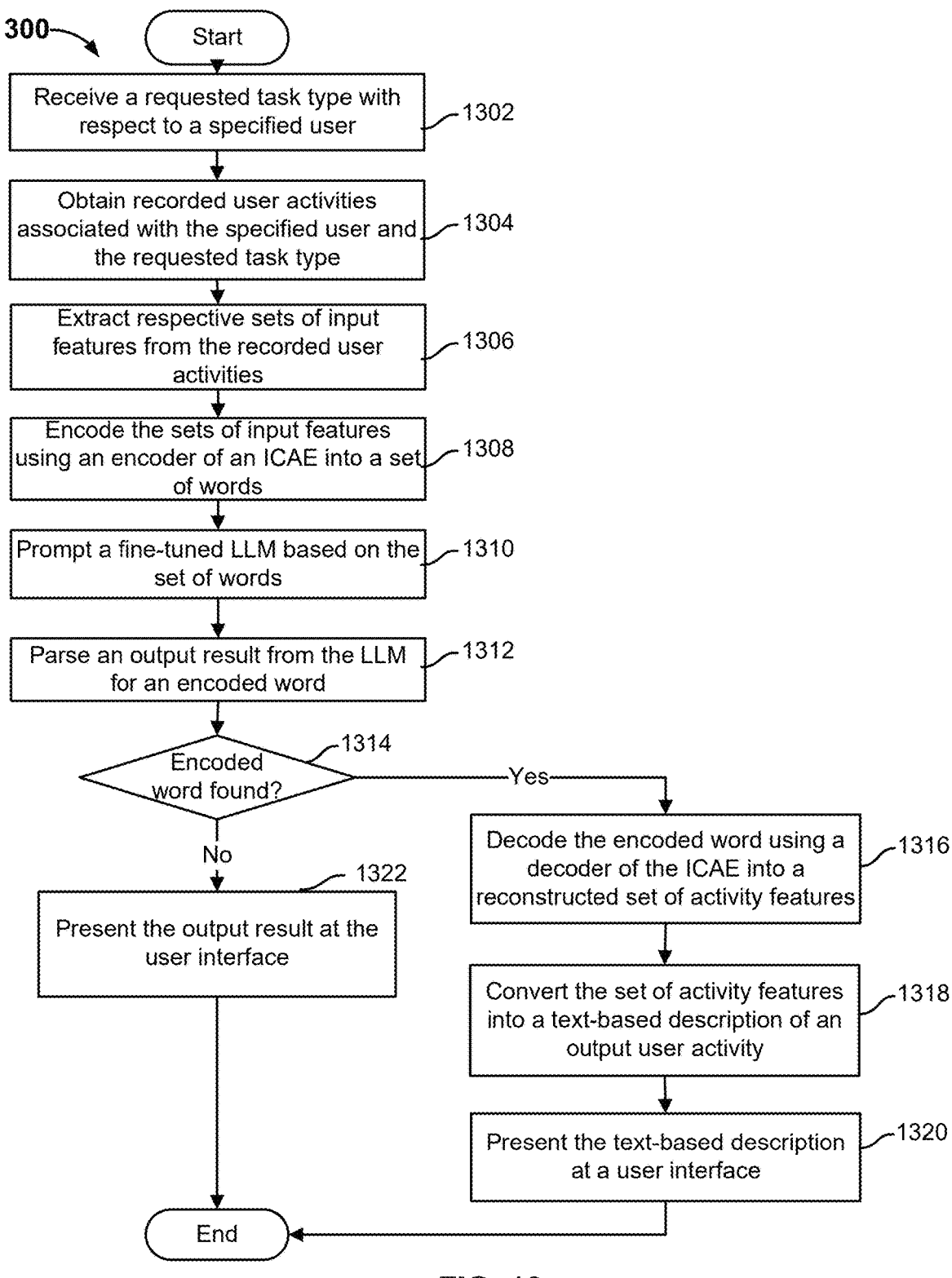
FIG. 13 is a flow diagram showing an example process of using a trained autoencoder and a fine-tuned machine learning model during inference in accordance with some embodiments.

FIG. 13 is a flow diagram showing an example process of using a trained autoencoder and a fine-tuned machine learning model during inference in accordance with some embodiments. In some embodiments, process 1200 of FIG. 12 may be implemented, at least in part, using process 1300. In some embodiments, process 1300 may be implemented, at least in part, using activity encoding and model prompting server 108 of FIG. 1.

At 1302, a requested task type with respect to a specified user is received. A request for a requested task type to be performed for a specified one or more users is received. For example, the request may be submitted by a user or programmatically generated by an application on behalf of a user.

At 1304, recorded user activities associated with the specified user and the requested task type are obtained. The user activities that have been performed by/recorded for the specified user(s) and across the time window prescribed by the requested task type are obtained.

At 1306, respective sets of input features are extracted from the recorded user activities.

At 1308, the sets of input features are encoded into a set of words using an encoder of an ICAE. The set of input features extracted from a corresponding recorded user activity is encoded into a corresponding word.

At 1310, a fine-tuned LLM is prompted based on the set of words. A prompt that is generated to ask the LLM to perform the requested task type includes the set of words as representations for the obtained set of user activities.

At 1312, an output result from the LLM is parsed for an encoded word. The output from the LLM is parsed to determine whether an encoded word can be found.

At 1314, whether the encoded word can be found from the parsed output result is determined. In the event that the encoded word can be found from the parsed output result, control is transferred to 1316. Otherwise, in the event that an encoded word cannot be found from the parsed output result, control is transferred to 1322.

At 1316, the encoded word is decoded using a decoder of the ICAE into a reconstructed set of activity features. If an encoded word (or more multiple encoded words) can be found from the parsed LLM output result, then each such encoded word is passed to the ICAE decoder to be decoded into a respective reconstructed set of activity features.

At 1318, the set of activity features is converted into a text-based description of an output user activity. Each reconstructed set of activity features can then be programmatically converted into a corresponding human-readable description of a user activity that is part of the LLM's output. For example, each output user activity can be a recommended user activity, a hypothetical user activity, or a real/historical user activity (e.g., that was selected among a user activity that was represented in the prompt to the LLM).

At 1320, the output result modified with the text-based description is presented at a user interface. The LLM output that is modified to include the human-readable description of each output user activity in place of a respective encoded word is then presented at the user interface as the response to the request.

At 1322, the output result is presented at the user interface. If no encoded word(s) can be found within the LLM's output result, then the output result is assumed to already be in the format of human-readable description, when can then be directly presented at the user interface as the response to the request.

Below are three different examples of requests to the LLM at inference time and the associated prompts as well as the corresponding LLM outputs:

1) Example Request for a Description of a User Activity
   Prompt: "Can you retrieve the activity type from the activity representation @ατγδΤΑτ?"
   LLM output result: "The activity type value is Run."
   In this first example, because the LLM's output does not include an encoded word, the output can be directly presented at a user interface.

2) Example Request for a Comparison of User Activities
   Prompt: "In terms of distance in km, how does @αθΚξΡπα differ from @αθΚπΤΒΗ?"
   LLM output result: "The distance in km of @αθΚπΤΒΗ is 1 km greater than that of @αθΚξΡπα."
   In this second example, the LLM's output includes two encoded words (@αθΚπΤΒΗ and @αθΚξΡπα), which also happen to match the encoded words in the input prompt. So, the encoded words in the input prompt can be converted into human-readable descriptions and then the updated LLM output with the human-readable descriptions in place of the encoded words can be presented at the user interface.

3) Example Request for a Generation of Recommended User Activities

Prompt: "Predict for a user with the following history of recorded user activities, next activities that the user might perform: [OFF] [@θαΘΧμΓ, @εβΞΦηΓ] [@ηαΚΦιΓ] [OFF] [OFF] [OFF] [@ιΩΟβγΓ, @PιHKPB, @PθΘKTB, @δαΞΧεσ]."

LLM output result: "Next Activities: [@ΧιΨΧβB] [@ΧκΨΧβB] [OFF] [@ΧκΨβB] [@ΧκΨΧβB] [@ΧκΨΧβB]."

In this third example, the LLM's output includes encoded words ([@ΧκΨΧβB], [@κΨΧβB], [@κΨΧβB], [@κΨΧβB], [@ΧκΨΧβB]) and so these encoded words in the input prompt can be converted into human-readable descriptions and then the updated LLM output with the human-readable descriptions in place of the encoded words can be presented at the user interface.

Figure 14:
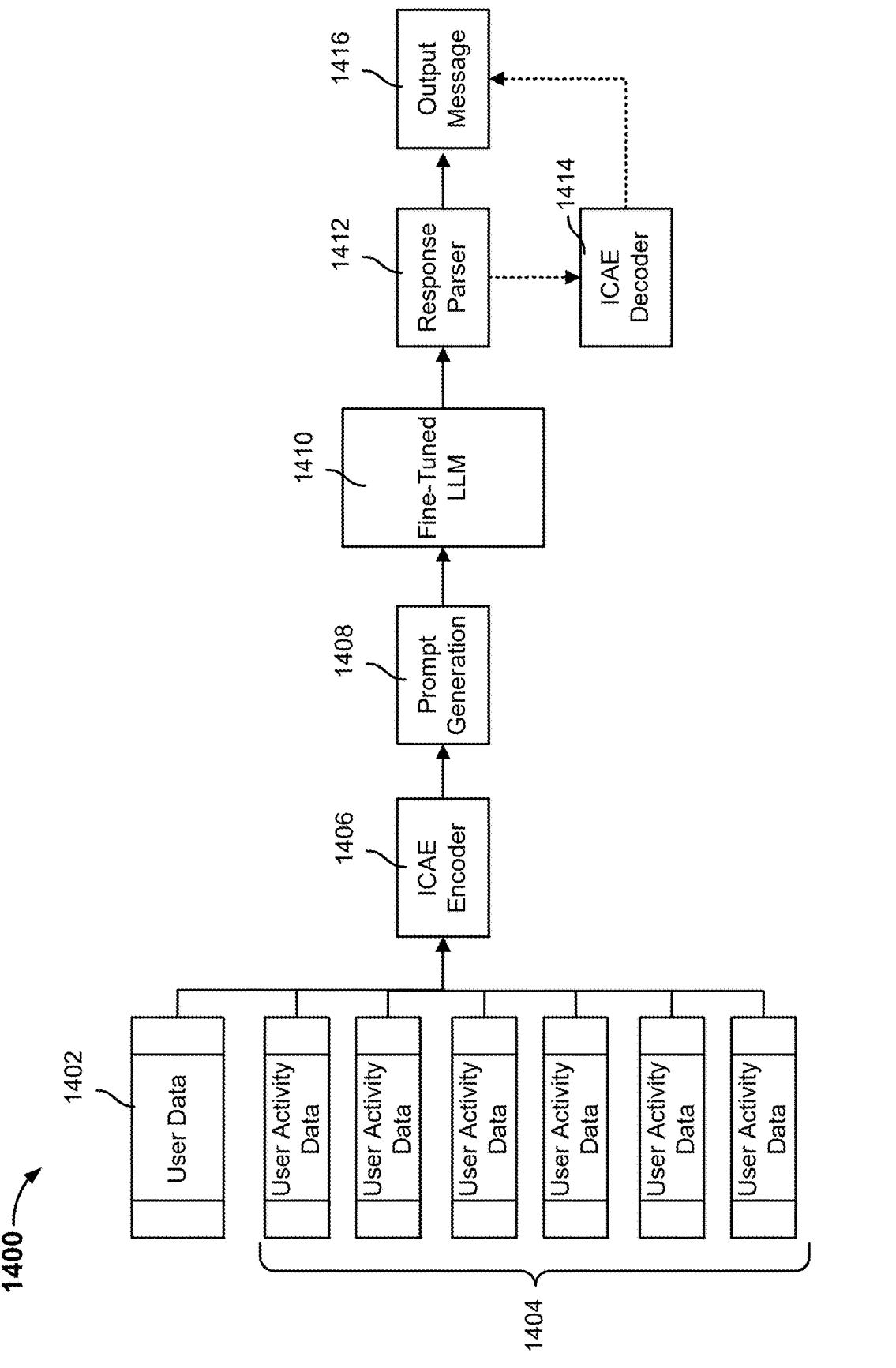
FIG. 14 is a diagram showing an example schematic that depicts the trained ICAE and the fine-tuned LLM responding to a query at inference time.

FIG. 14 is a diagram showing an example schematic that depicts the trained ICAE and the fine-tuned LLM responding to a query at inference time. In some embodiments, schematic 1400 can be used to implement process 1300 of FIG. 13. During the training of the ICAE, in a specific example, the ICAE has been configured to output words in the 24 Greek alphabet character space and of a character length of six. At inference time, a query is received with respect to a specified task to be performed by the fine-tuned LLM using the historical user activities associated with a specified user. For example, the specific task is to predict a next user activity that should be performed by user Alice. Prior to querying the LLM, user data (e.g., profile data such as the gender and age) 1402 associated with the user Alice and also the last six user activities (user activities 1404) that have been recorded for Alice are obtained. Then, Alice's user data 1402 and the respective sets of input features of Alice's last six user activities 1404 are fed into the trained ICAE encoder 1406 to obtain the following set of words: '[@NρβνNB]', '[@μαNεεE]', '[@ΧΨΟββΓ]', '[@ιβIΨλE]', '[@IΨλE]', and '[@ψYθπγη]'. At 1408, a prompt corresponding to the task of activity prediction is generated using the encoded words: '[@NρβνB]', '[@μαNεεE]', '[@ΧΨΟββΓ]', '[@ιβIΨλE]', '[@ιβIΨλE]', and '[@ψYθπγη]'. Fine-tuned LLM 1410 is then prompted using this prompt to perform the task of activity prediction. The LLM's output may include human-readable text descriptions and/or one or more encoded words. If the LLM's output includes any encoded words, the word(s) would need to be decoded and converted into human-readable description(s) of user activit(ies) before they can be presented at a user interface. As such, the LLM's output is fed into response parser 1412 to parse and detect whether any words of the LLM's output match criteria for further processing (e.g., strings of text that match a template/configured characteristics of words to be decoded by the ICAE). If any such words are found, then the word(s) are each fed into the ICAE decoder 1414 to reconstruct into a corresponding set of activity features, which is then programmatically converted into human-readable description of a user activity. For example, the human-readable description of each user activity that was represented by a word in the LLM's output is then inserted back into the LLM's original output to replace the original word and then, the modified LLM's output is presented as output message 1416 at a user interface. But if no such words are found, then the LLM's output is directly presented as output message 1416 at a user interface, without needing to call ICAE decoder 1414.

Returning to the above example, after prompting, fine-tuned LLM 1410 outputs the following: "The predicted next user activity is [@θΨNΦιE]." The LLM's output/response of "The predicted next user activity is [@θΨNΦιE]" is then parsed by response parser 1412 to identify word: "θΨNΦιE." The word "θΨNΦιE" is then fed into ICAE decoder 1414 to reconstruct the user activity features that are encoded/represented by "θΨNΦιE." The reconstructed features can then be programmatically converted into text-based (human interpretable) results comprising a text-based description/message, which can be presented as output message 1416 at a user interface for Alice. As shown with FIG. 14, the components of schematic 1400 enable developers to interact with the LLM more effectively, ensuring accurate communication and interpretation of inputs and outputs, and also efficient/cost-conscious leverage of LLM-based computation.

Various embodiments described herein provide numerous technical advantages, including but not limited to the following:

Semantic Representation: The lexicographical latent space enables the conversion of complex, high-dimensional data into a format that is easier for LLMs to interpret. Each "word" encodes meaningful patterns that facilitate efficient learning.

Efficient Use of LLMs: By creating a custom vocabulary from compressed data, embodiments described herein allow LLMs to handle vast datasets without overwhelming memory, a massive context window, or computational resources.

Flexible Application: The model architecture supports multiple tasks, including sequence prediction (e.g., predicting a sequence of activities to achieve specific goals) and summarization (e.g., generating summaries of user data or behaviors).

Scalable Architecture: The approach can be adapted to any domain where high-cardinality data needs to be converted into a lower-dimensional format for language modeling.

Hyper-personalization: The custom vocabulary can be used to represent multiple sets of multi-dimensional data related to an individual in a compact way, which enables an LLM to easily digest information related to that individual and be able to perform bespoke, personalized tasks specific to that individual.

The following are example alternative approaches that may be considered with respective trade-offs:

Direct Embedding-Based Approach: Instead of using variational autoencoders (VAEs) to generate lexicographical representations, a simpler embedding-based approach could be used. However, embeddings are often continuous and do not provide the same interpretability or structured syntax that the proposed VAE approach does.

Use of Existing Embedding Spaces: Pretrained embeddings (such as those from BERT or similar models) could be used to encode data. However, this would limit the model's ability to create a custom vocabulary tailored to the specific dataset, reducing its efficiency in certain tasks.

Non-Lexicographical Latent Space: The latent space could remain numeric rather than being transformed into a character-based format. While this would simplify model design, it would reduce interpretability and the potential for generating meaningful textual outputs.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

one or more processors configured to:

obtain a set of user activities according to a specified task;

obtain respective sets of input features from the set of user activities, wherein a set of input features comprises a set of structured data associated with an input activity;

use an encoder network of an autoencoder to encode the respective sets of input features into a set of input words, wherein the set of input features is encoded by the encoder network into a fixed-length series of numbers, wherein the fixed-length series of numbers is mapped into a set of non-numerical characters included in a selected character space associated with a custom lexicographical vocabulary, wherein the set of non-numerical characters forms an input word that comprises an abstraction of the set of structured data associated with the input activity;

send a prompt to a machine learning model to cause the machine learning model to perform the specified task using the set of input words, wherein the machine learning model has been fine-tuned using pairs of words encoded by the autoencoder from reference sets of input features associated with reference activities and reference text-based descriptions of the reference sets of input features associated with the reference activities, wherein the machine learning model has been fine-tuned to understand that the input word represents the set of structured data associated with the input activity, wherein the input word represents the set of structured data associated with the input activity in the prompt in fewer tokens than would have been needed by the set of structured data itself, wherein the input word is more efficient to compute by the machine learning model during inference than the set of structured data represented by the input word;

receive an output result from the machine learning model;

parse the output result to determine whether the output result includes an output word;

in response to a determination that the output result includes the output word, input the output word into a decoder network of the autoencoder to obtain a reconstructed set of features associated with an output activity; and present, at a user interface, a message associated with the output activity determined based at least in part on the reconstructed set of features associated with the output activity and the output result; and one or more memories coupled to the one or more processors and configured to provide instructions to the one or more processors.

2. The system of claim 1, wherein the machine learning model comprises a large language model (LLM).

3. The system of claim 1, wherein character positions within the input word are associated with different weights.

4. The system of claim 1, wherein the one or more processors are further configured to:

programmatically convert the reconstructed set of features associated with the output activity into a text-based description of one or more activities, wherein the message comprises the text-based description and the output result.

5. The system of claim 1, wherein the specified task comprises prediction of a subsequent user activity using the set of user activities, wherein the output activity comprises the subsequent user activity.

6. The system of claim 1, wherein the specified task further comprises summarization of the set of user activities.

7. The system of claim 1, wherein the specified task further comprises generation of a personalized workout plan.

8. The system of claim 1, wherein the specified task further comprises generation of a personalized recommended route associated with the output activity.

9. The system of claim 1, wherein the specified task comprises determination of an anomalous user activity, wherein the output activity comprises the anomalous user activity.

10. The system of claim 1, wherein the specified task further comprises determination of a cause of injury.

11. The system of claim 1, wherein the fixed-length series of numbers comprises a fixed-length series of real numbers, and wherein each real number of the fixed-length series of real numbers is rounded to a nearest integer prior to being mapped to a corresponding non-numerical character included in the custom lexicographical vocabulary.

12. The system of claim 1, wherein the selected character space associated with the custom lexicographical vocabulary is not associated with the English language.

13. A system, comprising:

one or more processors configured to:

obtain a set of training data from a set of user activity data, wherein the set of training data comprises a first set of input features comprising a first set of structured data associated with a first activity;

train an autoencoder using the set of training data to obtain a custom lexicographical vocabulary, wherein the autoencoder is trained to encode the first set of input features into a fixed-length series of numbers, wherein the fixed-length series of numbers is mapped into a set of non-numerical characters included in a selected character space associated with the custom lexicographical vocabulary, wherein the set of non-numerical characters forms a first word that comprises an abstraction of the first set of structured data associated with the first activity; and fine-tune a machine learning model to;

output a text-based description of a second set of input features associated with a second word encoded by the autoencoder from the second set of input features associated with a second activity; and perform a task in response to a prompt including a third word, wherein the machine learning model is fine-tuned to understand that the third word represents a third set of structured data associated with a third activity, wherein the third word represents the third set of structured data associated with the third activity in the prompt to the machine learning model in fewer tokens than would have been needed by the third set of structured data itself, wherein the third word is more efficient to compute by the machine learning model during inference than the third set of structured data represented by the third word, wherein an output result from the machine learning model is parsed to determine whether the output result includes an output word that is to be input into a decoder network of the autoencoder to obtain a reconstructed set of features associated with an output activity; and one or more memories coupled to the one or more processors and configured to provide instructions to the one or more processors.

14. The system of claim 13, wherein the first set of input features includes one or more of the following: an average speed, a maximum speed, a distance, an elevation gain, a moving time, an elapsed time, an average grade, a maximum grade, an average cadence, a maximum cadence, an average heart rate, a maximum heart rate, whether the first activity was part of a race or not, and whether the first activity was part of a commute or not.

15. The system of claim 13, wherein the autoencoder is configured to output encoded words of the selected character space from a specified numerical range.

16. The system of claim 13, wherein to train the autoencoder comprises to:

receive a pair of a reference set of input features from the set of training data and a modified set of input features derived from the reference set of input features;

input the reference set of input features into an encoder network of the autoencoder to obtain a reference word from a bottleneck layer of the autoencoder;

input the modified set of input features into the encoder network of the autoencoder to obtain a fuzzy word from the bottleneck layer of the autoencoder; and determine a similarity penalty based at least in part on a comparison between the reference word and the fuzzy word.

17. The system of claim 16, wherein the comparison comprises a determined Euclidean distance between the reference word and the fuzzy word.

18. The system of claim 16, wherein the reconstructed set of features associated with the output activity comprises a first reconstructed set of features, and wherein to train the autoencoder further comprises to:

input the reference word into the decoder network of the autoencoder to obtain a second reconstructed set of features; and determine a reconstruction penalty based at least in part on a comparison between the reference set of input features and the second reconstructed set of features.

19. The system of claim 18, wherein to train the autoencoder further comprises to:

determine an aggregated penalty based at least in part on the similarity penalty and the reconstruction penalty; and update parameters of the autoencoder based at least in part on the aggregated penalty.

20. The system of claim 13, wherein to fine-tune the machine learning model further comprises to:

receive an encoded word encoded from a reference set of input features associated with a reference user activity from the set of training data and a reference text-based description of the reference set of input features;

prompt the machine learning model using the encoded word to obtain an output description;

determine a domain adaptation penalty based on a comparison between a reference text-based description of the reference user activity and the output description; and update parameters of the machine learning model based at least in part on the domain adaptation penalty.

21. The system of claim 20, wherein the output result comprises a first output result, and wherein to fine-tune the machine learning model further comprises to:

receive a set of words from reference input features associated with user activities from the set of training data and a reference text-based result of performing a specified task on the set of words;

prompt the machine learning model to perform the specified task using the set of words to obtain a second output result;

determine a task-specific penalty based at least in part on a comparison between the reference text-based result and the second output result; and update the parameters of the machine learning model based at least in part on the task-specific penalty.

22. The system of claim 13, wherein the selected character space associated with the custom lexicographical vocabulary is not associated with the English language.

* * * * *